United States Patent
Matsuda et al.

(10) Patent No.: US 11,487,587 B2
(45) Date of Patent: Nov. 1, 2022

(54) INFORMATION PROCESSING SYSTEM AND METHOD FOR CONTROLLING INFORMATION PROCESSING SYSTEM

(71) Applicant: FUJITSU LIMITED, Kawasaki (JP)

(72) Inventors: Junichi Matsuda, Kawasaki (JP); Keiji Miyauchi, Yokohama (JP); Yuuichi Kobayashi, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/398,358

(22) Filed: Apr. 30, 2019

(65) Prior Publication Data
US 2019/0370067 A1    Dec. 5, 2019

(30) Foreign Application Priority Data
May 30, 2018    (JP) .............................. JP2018-103574

(51) Int. Cl.
G06F 9/46      (2006.01)
G06F 9/50      (2006.01)
G06F 9/455     (2018.01)

(52) U.S. Cl.
CPC .......... *G06F 9/505* (2013.01); *G06F 9/45558* (2013.01); *G06F 2009/4557* (2013.01)

(58) Field of Classification Search
CPC ....... G06F 9/45558; G06F 2009/45562; G06F 2009/45579; G06F 2009/45583;
(Continued)

(56) References Cited

U.S. PATENT DOCUMENTS 8,489,744 B2 *  7/2013  Elyashev ............ H04L 67/1002
                                               709/226
8,825,856 B1 *  9/2014  Breau ................. G06F 16/9566
                                               709/226
(Continued)

FOREIGN PATENT DOCUMENTS

JP    05-216842      8/1993
JP    07-302242      11/1995
JP    2016-157367    9/2016

OTHER PUBLICATIONS

Do, Truong-Xuan ; Kim, Younghan; State Management Function Placement for Service-Based 5G Mobile Core Architecture; Oct. 24, 2018, vol. 24 (2), p. 504-516.*

*Primary Examiner* — Camquy Truong
(74) *Attorney, Agent, or Firm* — Fujitsu Patent Center

(57) ABSTRACT

An information processing system includes an information processing apparatus and a management apparatus. A first processor of the information processing apparatus controls resource allocation to a first virtual machine that operates on the information processing apparatus and executes a virtual load balancer that distributes a first load to a plurality of second virtual machines. The first processor notifies, when a second load of the virtual load balancer exceeds a predetermined first threshold value, an occurrence of an overload to the management apparatus. The first processor receives and executes an addition command of adding a resource allocated to the first virtual machine. A second processor of the management apparatus creates, upon being notified of the occurrence of the overload, the addition command based on resource information of the information processing apparatus and management information of the virtual load balancer. The second processor notifies the addition command to the information processing apparatus.

6 Claims, 21 Drawing Sheets

(58) Field of Classification Search
CPC ........... G06F 2009/45595; G06F 9/505; G06F 2009/4557
See application file for complete search history.

(56) References Cited

U.S. PATENT DOCUMENTS

| | | | |
|---|---|---|---|
| 10,567,388 B1* | 2/2020 | Kruse | H04L 63/10 |
| 11,265,251 B2* | 3/2022 | Kommula | H04L 45/70 |
| 2007/0118838 A1* | 5/2007 | Tsujino | G06F 9/4881 |
| | | | 718/103 |
| 2014/0068611 A1* | 3/2014 | McGrath | G06F 9/5083 |
| | | | 718/1 |
| 2014/0379921 A1* | 12/2014 | Morley | G06F 9/5027 |
| | | | 709/226 |
| 2015/0026688 A1* | 1/2015 | Dice | G06F 9/4843 |
| | | | 718/102 |
| 2017/0286187 A1* | 10/2017 | Chen | G06F 9/48 |

\* cited by examiner

FIG. 3

| VM-ID | VIRTUALIZATION INFRASTRUCTURE APPARATUS NAME | PROCESS ID | USED CPU-ID | USED MEMORY AMOUNT |
|---|---|---|---|---|
| 0001 | Server 1 | 1000 | 1 | 350 |
| 0002 | Server 1 | 2000 | 2 | 300 |
| 0003 | Server 1 | 3000 | 3 | 350 |
| 0004 | Server 2 | 1000 | 1 | 300 |
| ⋮ | ⋮ | ⋮ | ⋮ | ⋮ |

FIG. 4

| VIRTUALIZATION INFRASTRUCTURE APPARATUS NAME | MOUNTED CPU-ID NUMBER | UNUSED CPU-ID NUMBER | MOUNTED MEMORY AMOUNT | UNUSED MEMORY AMOUNT |
|---|---|---|---|---|
| Server 1 | 20 | 17 | 264000 | 263000 |
| Server 2 | 20 | 19 | 264000 | 262000 |
| Server 3 | 20 | 20 | 264000 | 264000 |
| ⋮ | ⋮ | ⋮ | ⋮ | ⋮ |

FIG. 5

| VIRTUALIZATION INFRASTRUCTURE APPARATUS NAME | CPU-ID | USED FLAG |
|---|---|---|
| Server 1 | 1 | use |
| Server 1 | 2 | use |
| Server 1 | 3 | no use |
| Server 1 | 4 | no use |
| ⋮ | ⋮ | ⋮ |
| Server 2 | 1 | use |
| Server 2 | 2 | use |
| ⋮ | ⋮ | ⋮ |

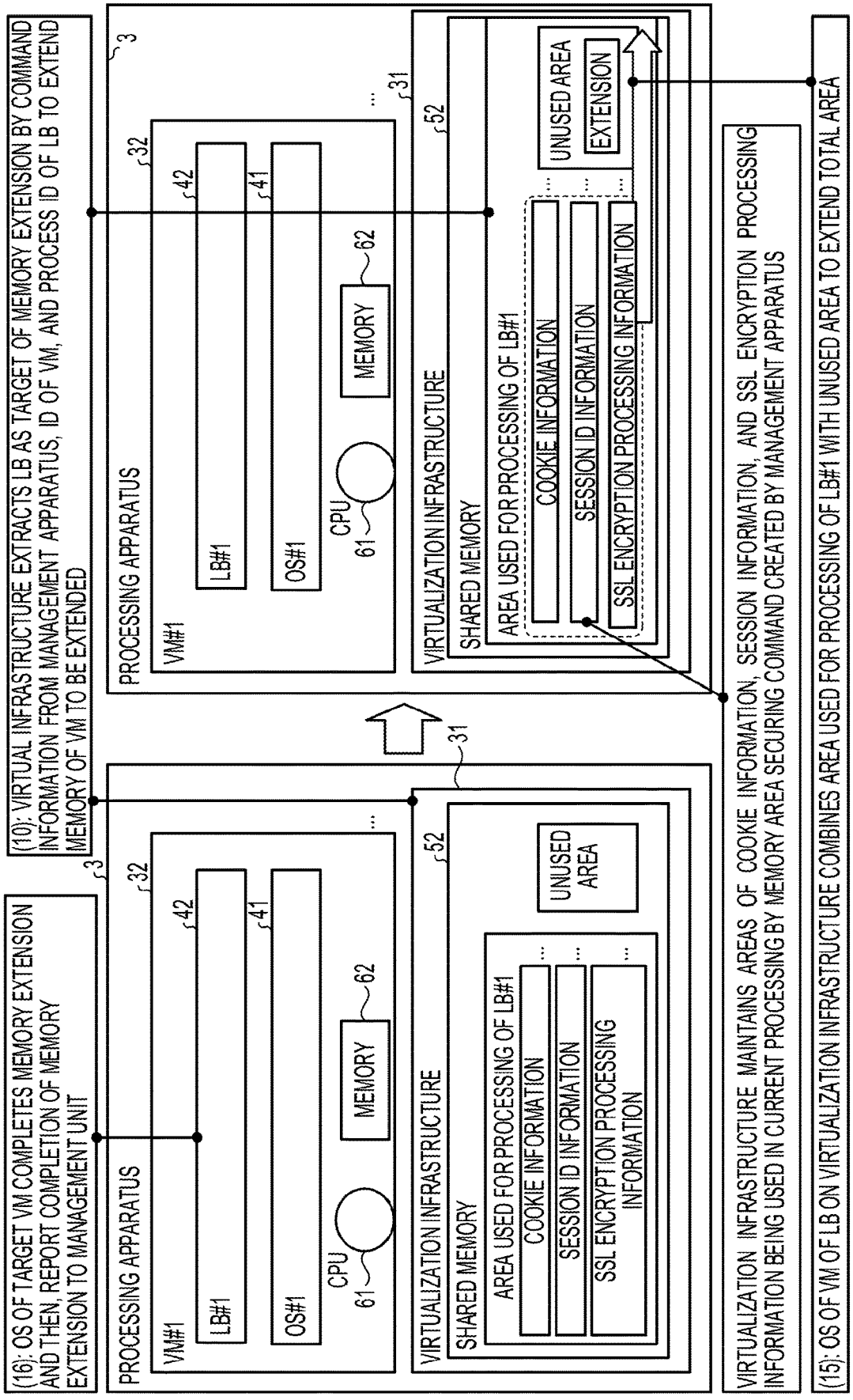

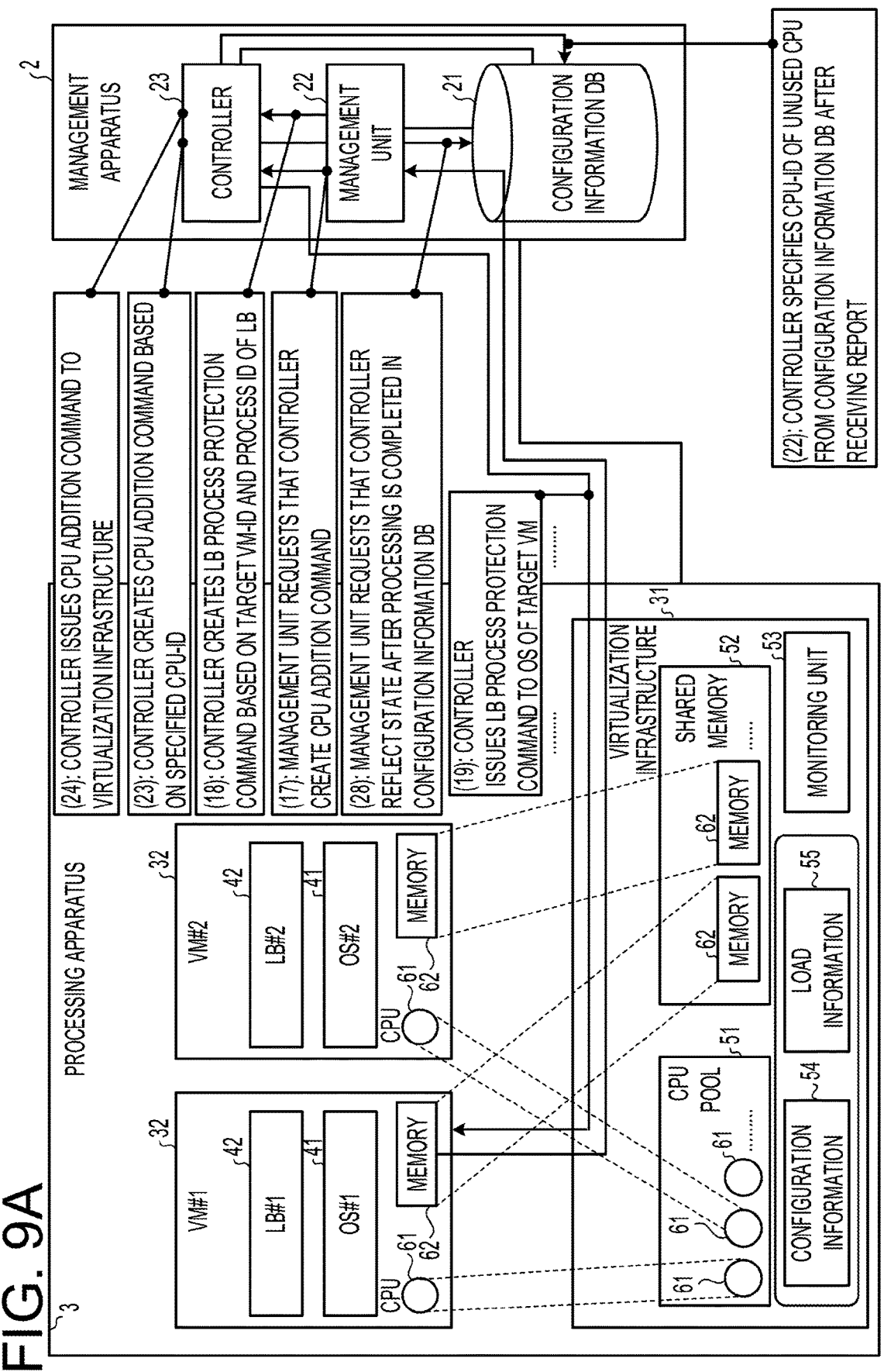

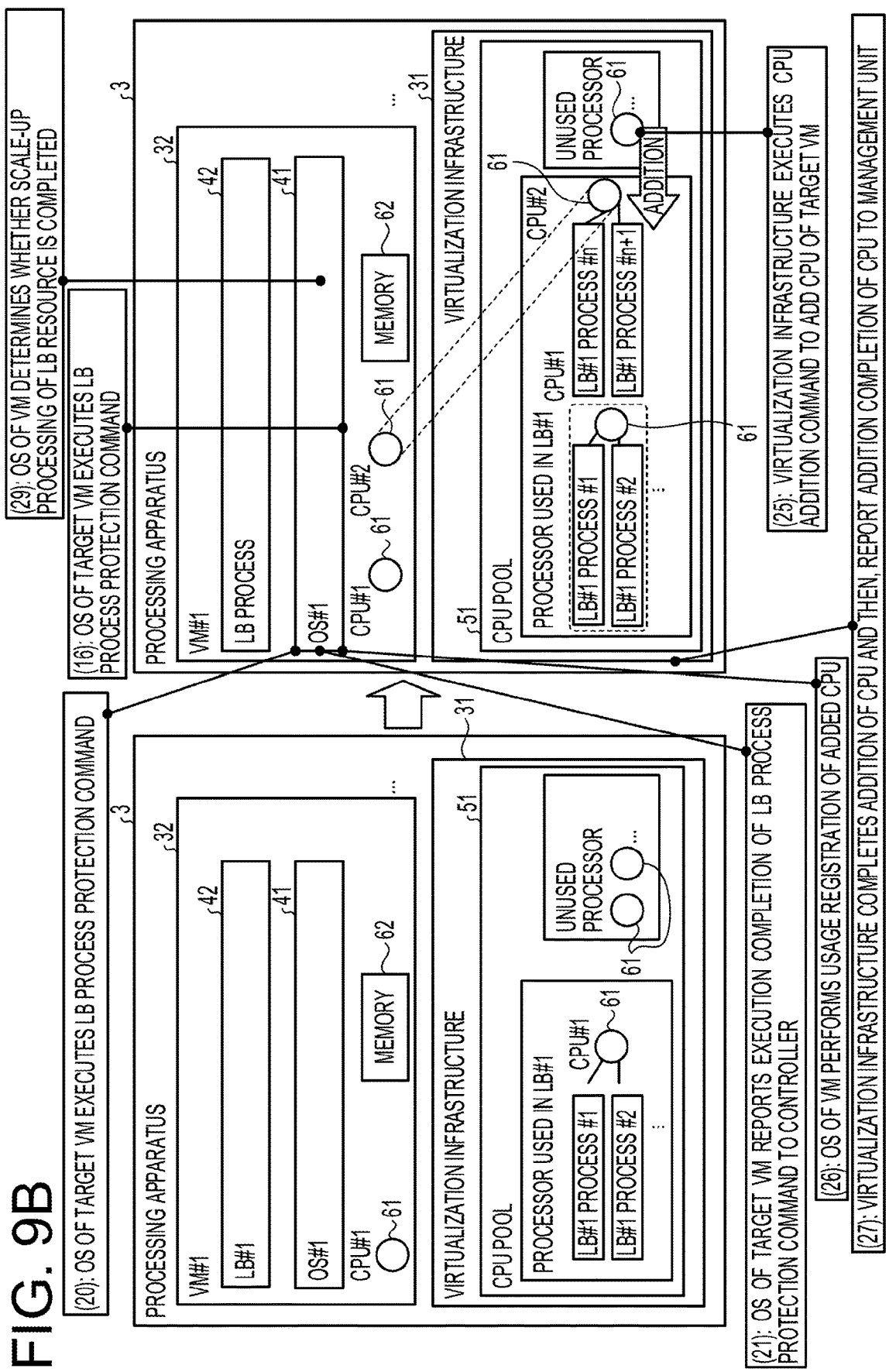

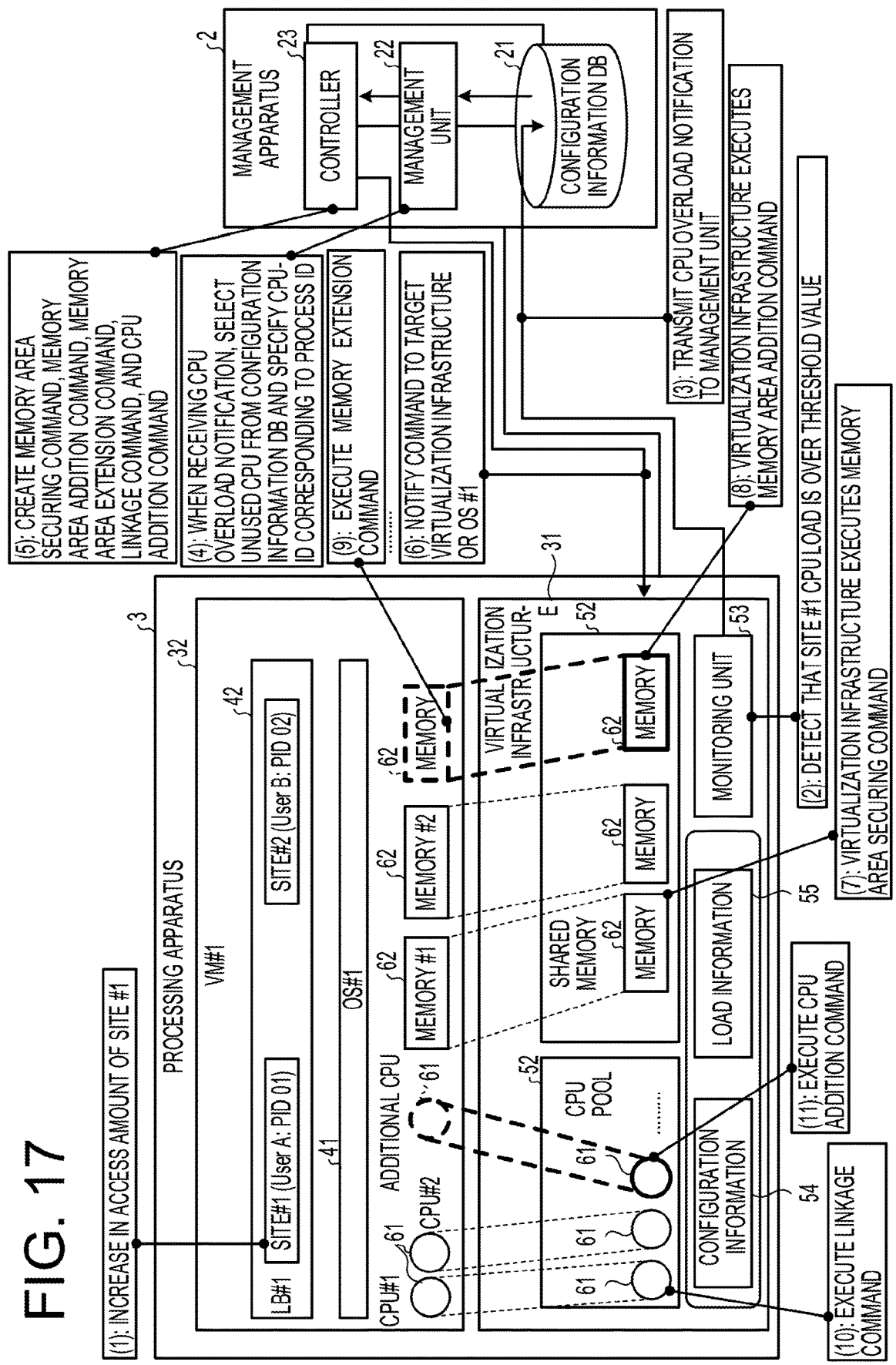

INFORMATION PROCESSING SYSTEM AND METHOD FOR CONTROLLING INFORMATION PROCESSING SYSTEM

CROSS-REFERENCE TO RELATED APPLICATION

This application is based upon and claims the benefit of priority of the prior Japanese Patent Application No. 2018-103574, filed on May 30, 2018, the entire contents of which are incorporated herein by reference.

FIELD

The embodiments discussed herein are related to an information processing system and a method for controlling the information processing system.

BACKGROUND

In a cloud system, scaling out is important to increase a processing capacity of a system by increasing the number of servers constituting the system with an increase in load, but a virtual load balancer (virtual load distributing apparatus), which is a key of the scaling out, may become a bottleneck. Here, the virtual load balancer is a load balancer executed by a virtual machine (VM) and carries out a processing of distributing the load to a plurality of VMs that execute a processing.

When an overload occurs in the virtual load balancer, even when a physical resource allocated to the VM that executes the processing is added, a performance of the cloud system is not enhanced. Therefore, in the cloud system, the scaling out of the virtual load balancer becomes important. As a result, there is a technique in which the virtual load balancer automatically scales out according to a load situation.

As a technique related to a load distribution, there is a technique that enhances the processing efficiency of the entire system by increasing efficiency and speed of a transaction processing in a system that performs the transaction processing between a client and a server connected on a network. In the technique, the load of transaction is monitored and the number of business server processes is controlled based on a monitoring result. In addition, each business server processing determines a business client that needs to accept a processing request and each business server processing manages a business client that accepts the processing request.

There is a technique that executes effective distribution by eliminating a mechanism which becomes the bottleneck against the increase in load by enabling the load distribution by transmitting an access request to another alternative resource management device when the access request arrives at a resource having a high load.

Further, there is a distribution processing system which is constituted by a normal data distribution processing system and a high-load data distribution processing system, and suppresses an occurrence of an influence exerted on signal processing of another data or a frequent occurrence of inefficient scaling out while continuously processing high-load data when the high-load data is generated. In the distribution processing system, each node of the normal data distribution processing system extracts high-load data by measuring a processing load of data and a resource load. In addition, each node transfers the extracted high-load data to the high-load data distribution processing system that exclusively processes the high-load data. Further, the node of the high-load data distribution processing system extracts data with a reduced load as normal load data and returns the extracted data to the normal data distribution processing system.

Related techniques are disclosed in, for example, Japanese Laid-open Patent Publication No. 07-302242, Japanese Laid-open Patent Publication No. 05-216842, and Japanese Laid-open Patent Publication No. 2016-157367.

Since an automatic scaling out of the virtual load balancer takes a time of approximately several minutes, there is a problem that it is impossible to make up for an instantaneous increase in access amount at a site caused by, for example, television broadcasting (e.g., a website).

SUMMARY

According to an aspect of the present invention, provided is an information processing system including an information processing apparatus and a management apparatus. The information processing apparatus includes a first processor. The management apparatus includes a memory and a second processor coupled to the memory. The first processor is configured to control resource allocation to a first virtual machine that operates on the information processing apparatus and executes a virtual load balancer that distributes a first load to a plurality of second virtual machines. The first processor is configured to monitor a second load of the virtual load balancer. The first processor is configured to notify, when the second load exceeds a predetermined first threshold value, an occurrence of an overload to the management apparatus. The first processor is configured to receive, from the management apparatus, an addition command of adding a resource allocated to the first virtual machine. The first processor is configured to execute the addition command to add the resource. The second processor is configured to create, upon being notified of the occurrence of the overload, the addition command based on resource information of the information processing apparatus and management information of the virtual load balancer. The resource information and the management information are stored in the memory. The second processor is configured to notify the addition command to the information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an LB management table;

FIG. 4 is a diagram illustrating an example of a resource management table;

FIG. 5 is a diagram illustrating an example of a CPU-ID management table;

FIG. 8B is a second diagram illustrating an operation relating to memory extension;

FIG. 9A is a first diagram illustrating an operation relating to CPU extension;

FIG. 9B is a second diagram illustrating an operation relating to CPU extension;

FIG. 17 is a diagram illustrating operations of a processing apparatus and a management apparatus when a load of one site rises.

DESCRIPTION OF EMBODIMENTS

Hereinafter, embodiments will be described in detail with reference to the accompanying drawings. Further, the embodiments do not limit a disclosed technique.

First Embodiment

Figure 1:
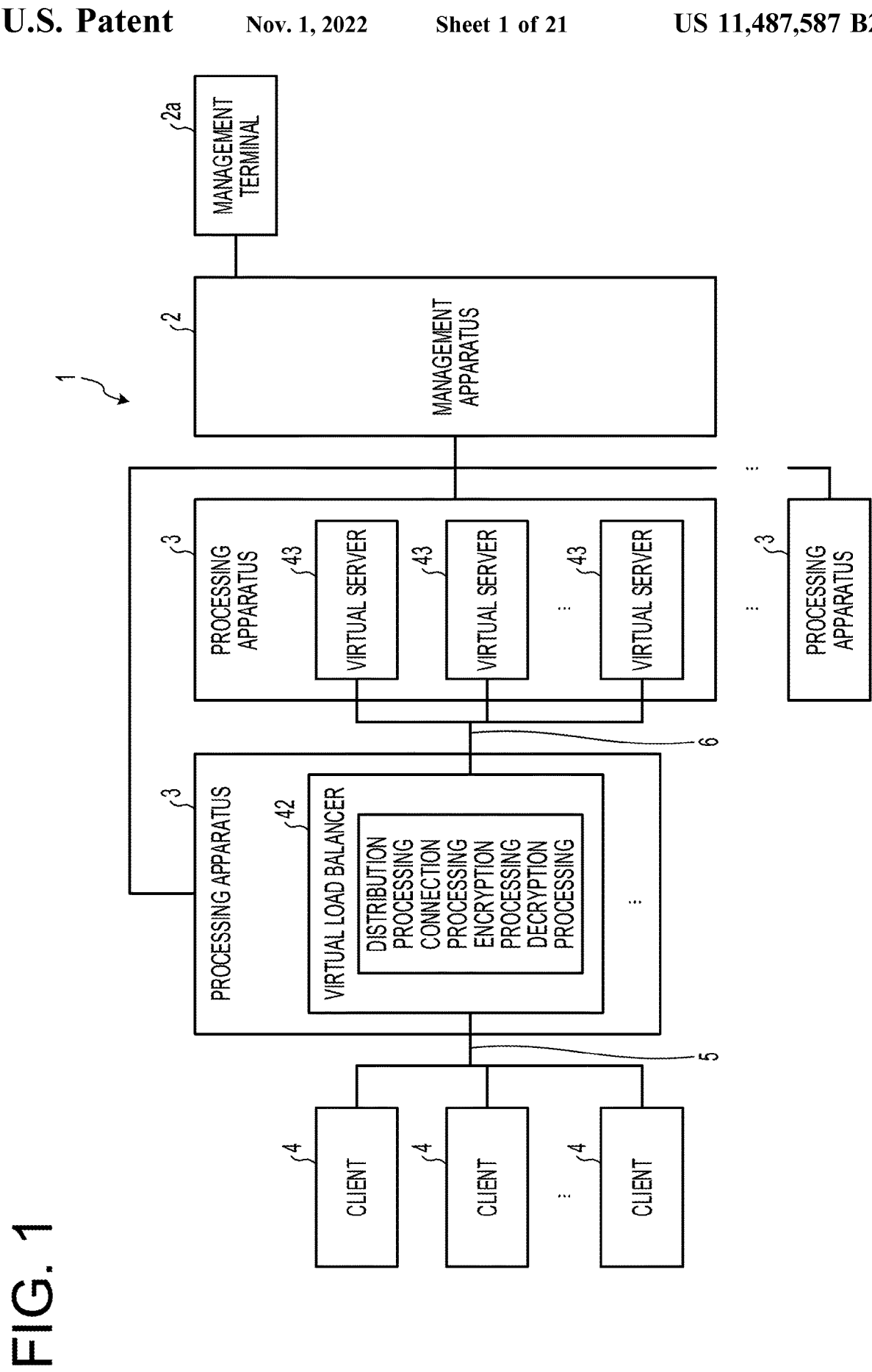
FIG. 1 is a diagram illustrating a configuration of an information processing system according to a first embodiment.

First, descriptions will be made on a configuration of an information processing system according to a first embodiment. FIG. 1 is a diagram illustrating the configuration of the information processing system according to the first embodiment. As illustrated in FIG. 1, the information processing system 1 according to the first embodiment includes a management apparatus 2, a management terminal 2a, a processing apparatus 3 in which a virtual load balancer 42 operates, a plurality of processing apparatuses 3 in which a virtual server 43 operates, and a plurality of clients 4.

The processing apparatus 3 in which the virtual load balancer 42 operates is connected to the plurality of clients 4 through a network 5 and connected to the plurality of processing apparatuses 3 in which the virtual server 43 operates through a network 6. The management apparatus 2 is connected to each processing apparatus 3 and the management terminal 2a. Further, the number of processing apparatuses 3 in which the virtual load balancer 42 operates may be plural. In addition, the number of processing apparatuses 3 in which the virtual server 43 operates may be one.

The management apparatus 2 is an apparatus that manages information regarding the processing apparatus 3 to control the processing apparatus 3. The management terminal 2a is a terminal used by an administrator for communication with the management apparatus 2. The processing apparatus 3 is an information processing apparatus that executes a VM. The virtual server 43 is a VM that executes information processing. The virtual load balancer 42 is a virtual load distributing apparatus which is executed in the VM and distributes a load to the virtual server 43. The client 4 is an apparatus that requests a processing.

The processing requested by the client 4 is accepted by the virtual load balancer 42 and distributed to the virtual server 43. The virtual load balancer 42 executes a connection management including session maintenance and session management, and an encryption processing and a decoding processing for a secure sockets layer (SSL), in addition to a distribution processing.

Figure 2:
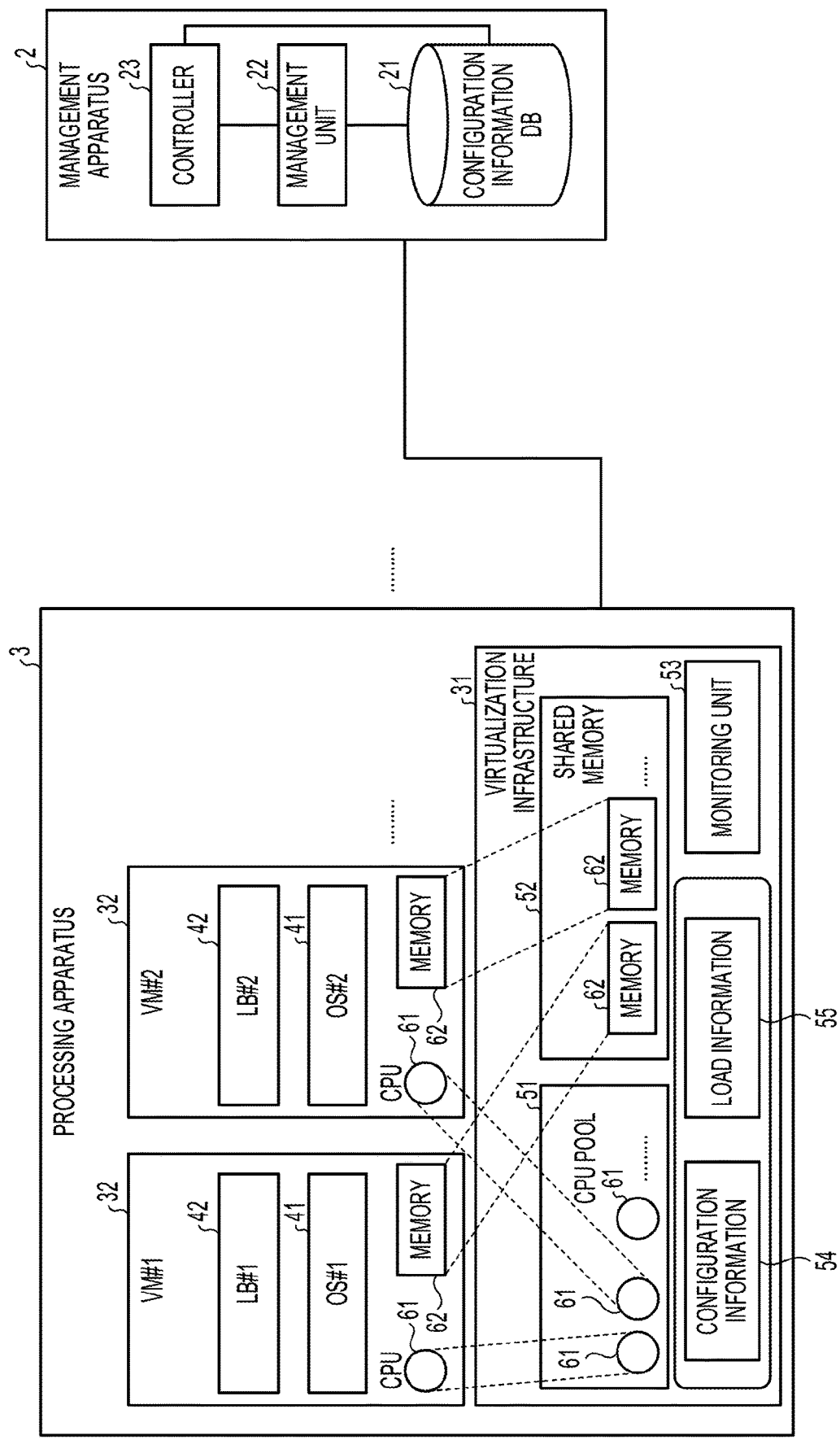
FIG. 2 is a diagram illustrating a functional configuration of a processing apparatus and a management apparatus in which a virtual load balancer operates.

Next, descriptions will be made on functional configurations of the processing apparatus 3 and the management apparatus 2 in which the virtual load balancer 42 operates. FIG. 2 is a diagram illustrating the functional configurations of the processing apparatus 3 and the management apparatus 2 in which the virtual load balancer 42 operates. As illustrated in FIG. 2, in the processing apparatus 3 in which the virtual load balancer 42 operates, a virtualization infrastructure 31 and a plurality of VMs 32 represented by VM #1, VM #2, etc. operate. In VM #1, an OS 41 represented by operating system (OS) #1 and an LB 42 represented by LB #1 operate. Here, the LB 42 represents the virtual load balancer 42. In VM #2, the OS 41 represented by OS #2 and the LB 42 represented by LB #2 operate.

The virtualization infrastructure 31 virtualizes and controls the processing apparatus 3. The virtualization infrastructure 31 manages resources including, for example, a central processing unit (CPU) 61 as an arithmetic processing unit or processor included in the processing apparatus 3, and a memory 62, and allocates the resources to the VM 32. The virtualization infrastructure 31 manages the CPU 61 using a CPU pool 51 and manages the memory 62 as a shared memory 52. Further, the processor includes, for example, a graphics processing unit (GPU), a network processing unit (NPU), and a digital signal processor (DSP) in addition to the CPU.

The virtualization infrastructure 31 includes a monitoring unit 53. The monitoring unit 53 monitors a CPU usage rate of the LB 42 and transmits a resource addition request directed to the LB 42 to the management apparatus 2 when the CPU usage rate exceeds a predetermined threshold value. Further, the monitoring unit 53 transmits information of the virtualization infrastructure 31, information of the LB 42, and information of the processing apparatus 3 to the management apparatus 2.

The virtualization infrastructure 31 stores configuration information 54 and load information 55. The configuration information 54 includes, for example, information on the operating VM 32 and information on the LB 42. The load information 55 includes the CPU usage rate for each VM 32 or for each LB 42.

The management apparatus 2 includes a configuration information DB 21, a management unit 22, and a controller 23. The configuration information DB 21 stores the information sent from the monitoring unit 53. The configuration information DB 21 includes an LB management table, a resource management table, and a CPU-ID management table.

The LB management table stores the information on the LB 42. FIG. 3 is a diagram illustrating an example of an LB management table. As illustrated in FIG. 3, the LB management table stores a VM-ID, a virtualization infrastructure apparatus name, a process ID, a used CPU-ID, and a used memory amount for each LB 42.

The VM-ID represents a number which identifies the VM 32 that executes the LB 42. The virtualization infrastructure apparatus is the processing apparatus 3 in which the virtualization infrastructure 31 operates and the virtualization infrastructure apparatus name is a name which identifies the processing apparatus 3 in which the LB 42 operates. The process ID is a number which identifies a processing of the LB 42 (hereinafter, referred to as an LB process). That is, the LB 42 is executed as the processing in the VM 32. The used CPU-ID is a number which identifies the CPU 61 allocated to the VM 32 that executes the LB 42. The used memory amount is an amount of the memory 62 allocated to the VM 32 that executes the LB 42. A unit of the used memory amount is, for example, megabyte (MB).

For example, the process ID of the LB process operating on the VM 32 identified by "0001" in the processing apparatus 3 identified by "Server 1" is "1000". Further, the CPU 61 identified by "1" is allocated and the memory 62 of "350 MB" is allocated to the corresponding VM 32.

The resource management table stores the information on the CPU 61 and the memory 62. FIG. 4 is a diagram illustrating an example of a resource management table. As illustrated in FIG. 4, the resource management table stores the virtualization infrastructure apparatus name, the number of mounted CPU-IDs, the number of unused CPU-IDs, a mounted memory amount, and an unused memory amount for each processing apparatus 3.

The virtualization infrastructure apparatus name is the name of the processing apparatus 3. The number of mounted CPU-IDs is the number of CPUs 61 mounted on the processing apparatus 3. The number of unused CPU-IDs is the number of CPUs 61 which are not being used. The mounted memory amount is the amount of memory 62 mounted on the processing apparatus 3. The unused memory amount is the amount of memory 62 which is not being used. The units of the mounted memory amount and the unused memory amount are, for example, MB.

For example, in the processing apparatus 3 identified by "Server 1", "20" CPUs 61 and "264000 MB" memory 62 are mounted, the number of CPUs 61 which are not being used is "17", and the amount of the memory 62 which is not being used is "263000 MB".

The CPU-ID management table stores information on a usage situation of the CPU 61. FIG. 5 is a diagram illustrating an example of a CPU-ID management table. As illustrated in FIG. 5, the CPU-ID management table stores the virtualization infrastructure apparatus name, the CPU-ID, and a used flag for each CPU 61. The virtualization infrastructure apparatus name is the name of the processing apparatus 3 on which the CPU 61 is mounted. Herein, the CPU-ID is a number which identifies the CPU 61. The used flag indicates "use" indicating that the CPU 61 is being used or "no use" indicating that the CPU 61 is not being used. For example, the CPU 61 identified by "1" in the processing apparatus 3 identified by "Server 1" is being used.

Referring back to FIG. 2, the management unit 22 manages resources and VMs 32 of all of the processing apparatuses 3 using the configuration information DB 21. For example, the management unit 22 receives information of the virtualization infrastructure 31, information of the LB 42, and information of the processing apparatus 3 from the monitoring unit 53, and stores the received information in the configuration information DB 21.

Upon receiving the resource addition request from the monitoring unit 53 of the processing apparatus 3 in which the LB 42 operates, the management unit 22 requests the controller 23 to create a memory area addition command of extending the memory 62. In addition, when the management unit 22 is notified of the completion of the memory extension from the virtualization infrastructure 31 which executes the memory extension for the LB 42, the management unit 22 requests the controller 23 to create a memory area extension command of extending the memory area of the VM 32. Further, upon being notified of the completion of the extension of the memory area from the OS 41 of the VM 32 that executes the LB 42, the management unit 22 requests the controller 23 to create the CPU addition command.

The controller 23 creates a memory area securing command that secures a data area used by the LB 42 for processing and a memory area addition command based on a request for creating the memory area addition command from the management unit 22, and issues the created commands to the virtualization infrastructure 31 having the monitoring unit 53 that transmits the resource addition request. Further, the controller 23 creates the memory area extension command based on the creation request of the memory area extension command from the management unit 22, and issues the created memory area extension command to the OS 41 of the VM 32 that performs a memory addition.

The controller 23 creates an LB process protection command of requesting fixed allocation (protection) of the CPU 61 for the LB process and a CPU addition command of adding the CPU 61 based on the creation request of the CPU addition command from the management unit 22. In addition, the controller 23 issues the LB process protection command to the OS 41 of the VM 32 to which the CPU 61 is added and issues the CPU addition command to the virtualization infrastructure 31 including the monitoring unit 53 that has transmitted transmits the resource addition request.

Figure 6:
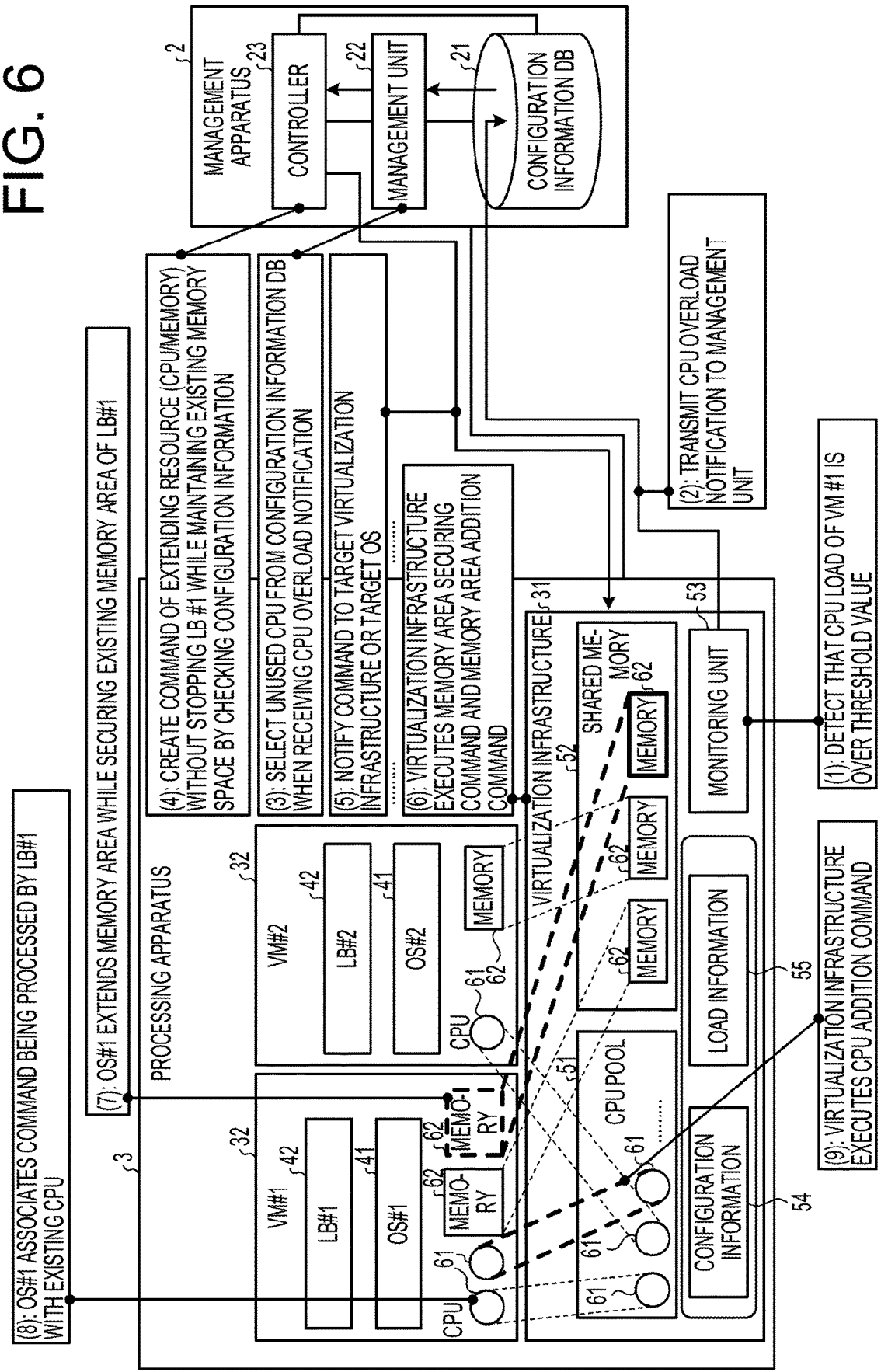
FIG. 6 is a diagram illustrating operations of a processing apparatus and a management apparatus when an overload occurs in an LB.

Next, descriptions will be made on operations of the processing apparatus 3 and the management apparatus 2 when the overload occurs in the LB 42. FIG. 6 is a diagram illustrating the operations of the processing apparatus 3 and the management apparatus 2 when the overload occurs in the LB 42.

As illustrated in FIG. 6, the monitoring unit 53 of the processing apparatus 3 in which LB #1 operates detects that a CPU load of VM #1 is over a threshold value (1) and transmits a CPU overload notification to the management unit 22 (2). When the CPU overload notification is received, the management unit 22 selects the unused CPU 61 from the configuration information DB 21 (3).

The controller 23 creates a command of extending the resources (e.g., the CPU 61 and the memory 62) without stopping LB #1 while maintaining the existing memory space by confirming the configuration information. Specifically, the controller 23 creates the memory area securing command, the memory area addition command, the memory area extension command, the LB process protection command, and the CPU addition command. In addition, the controller 23 notifies the memory area securing command, the memory area addition command, and the CPU addition command to the virtualization infrastructure 31 and notifies the memory area extension command and the LB process protection command to the target OS 41 (5). Further, a timing at which each command is created and notified will be described below.

The virtualization infrastructure 31 executes the memory area securing command and then, executes the memory area addition command (6). In addition, OS #1 executes the memory area extension command and extends the memory area while securing the existing memory area of LB #1 (7). Further, OS #1 executes the LB process protection command and associates a command being processed in LB #1 with the existing CPU 61 to prevent LB #1 from being stopped. In addition, the virtualization infrastructure 31 executes the CPU addition command (9).

As described above, since the virtualization infrastructure 31 executes the memory area addition command and the CPU addition command to add the resources allocated to VM #1, the information processing system 1 may eliminate the overload of LB #1. Further, since the virtualization infrastructure 31 executes the memory area securing command before the memory area addition command, the information processing system 1 may extend the memory 62 while securing a data region used by the LB 42 for processing. In addition, since OS #1 executes the LB process protection command before the virtualization infrastructure 31 executes the CPU addition command, the information processing system 1 may add the CPU 61 without stopping LB #1.

Figure 7:
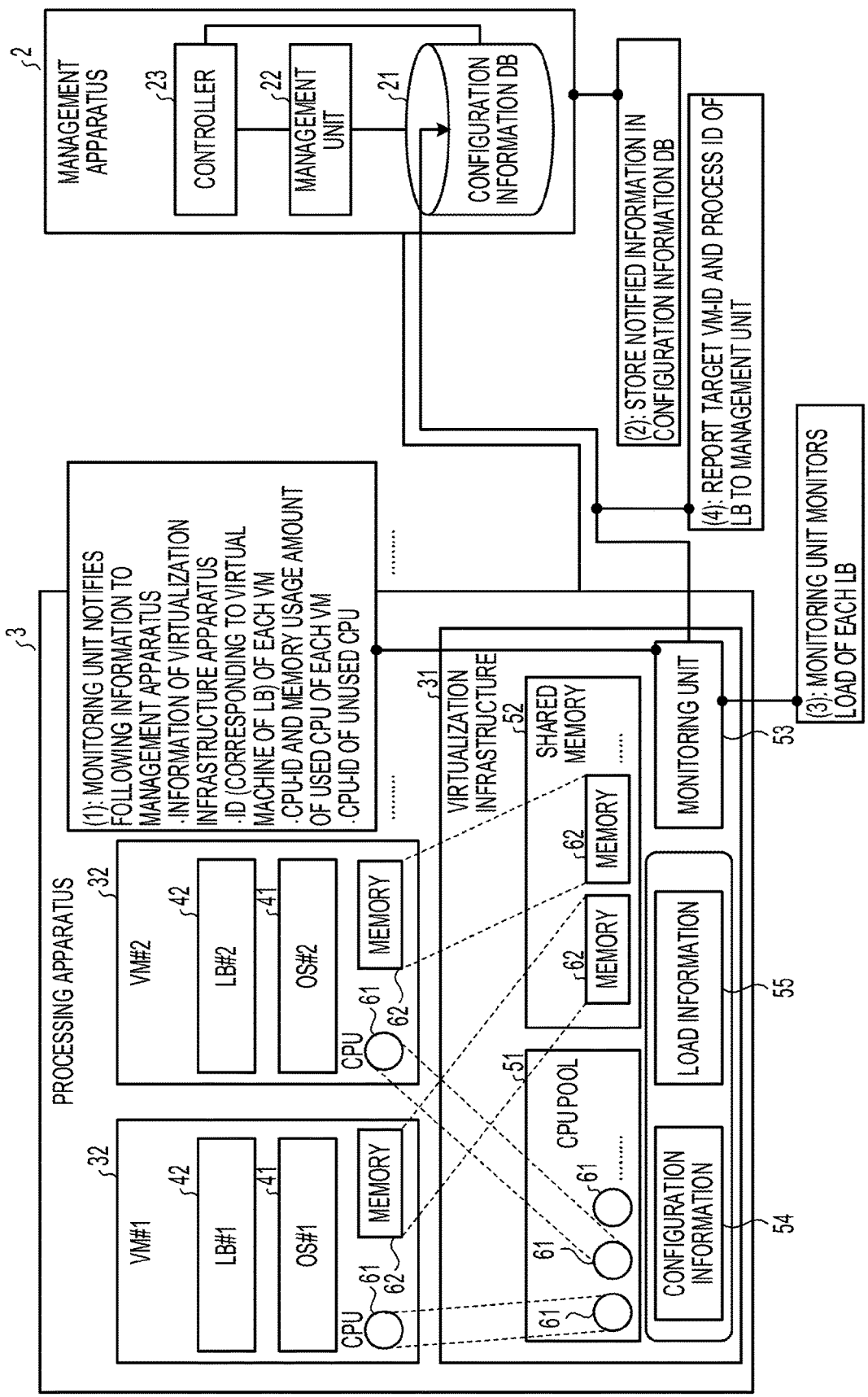
FIG. 7 is a diagram illustrating an operation related to information collection.
Figure 10:
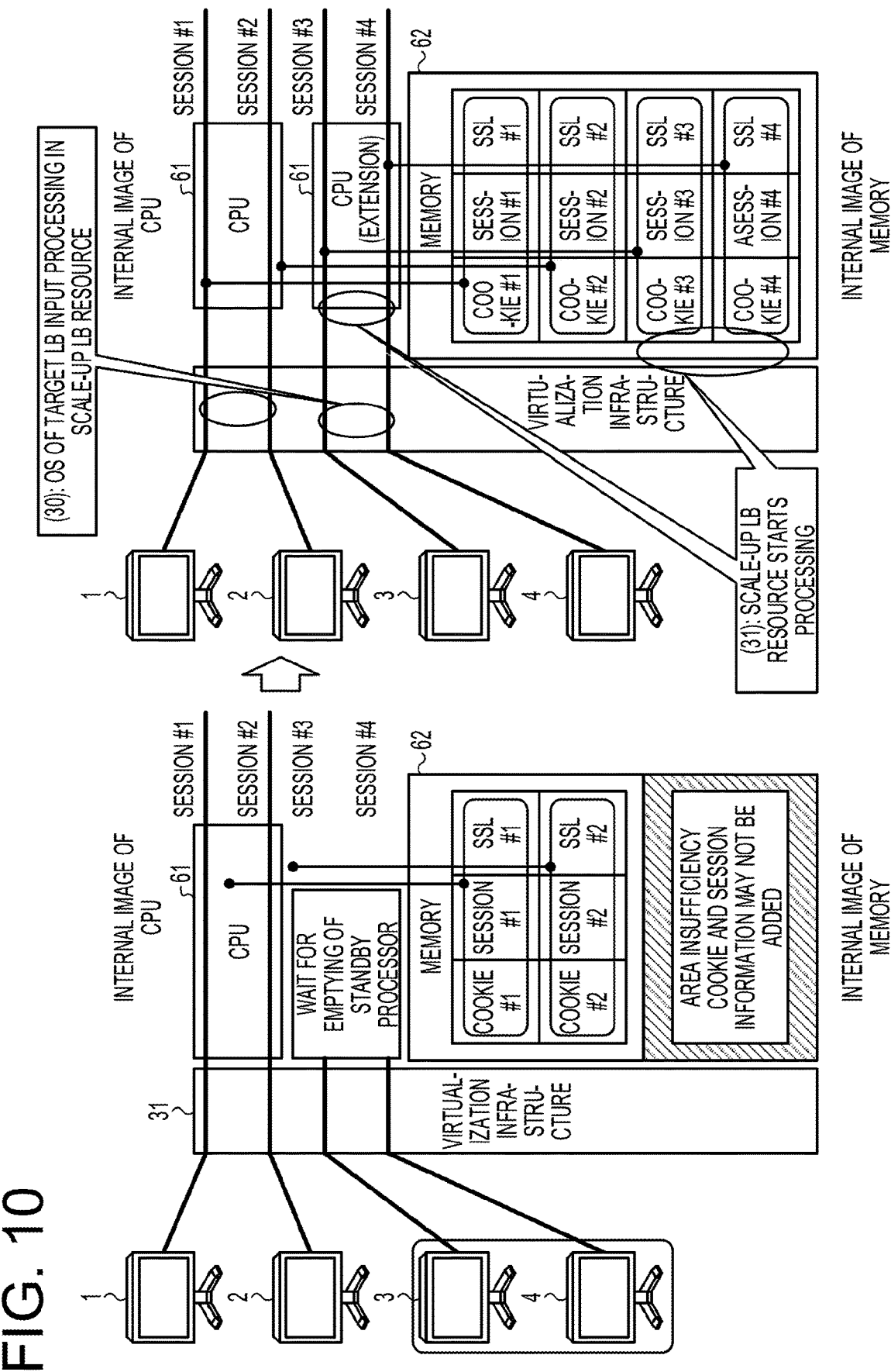
FIG. 10 is a diagram illustrating a processing input to a scale-up LB.

Next, the details of the operation illustrated in FIG. 6 will be described with reference to FIGS. 7 to 10. FIG. 7 is a diagram illustrating an operation related to information collection, FIGS. 8A and 8B are diagrams illustrating an operation relating to memory extension, FIGS. 9A and 9B are diagrams illustrating an operation relating to CPU extension, and FIG. 10 is a diagram illustrating a processing input to a scale-up LB 42.

As illustrated in FIG. 7, the monitoring unit 53 notifies the information of the virtualization infrastructure apparatus, the ID of each VM 32, the CPU-ID and memory usage amount of the used CPU 61 of each VM 32, and the CPU-ID of the unused CPU 61 to the management apparatus 2 (1). Here, each VM 32 is a VM 32 that executes the LB 42.

Then, the management unit 22 stores the notified information in the configuration information DB 21 (2). In addition, the monitoring unit 53 monitors the load of each LB 42 (3) and when the overload occurs, the monitoring unit 53 reports a target VM-ID and the process ID of the LB 42 to the management unit 22 (4).

Figure 8A:
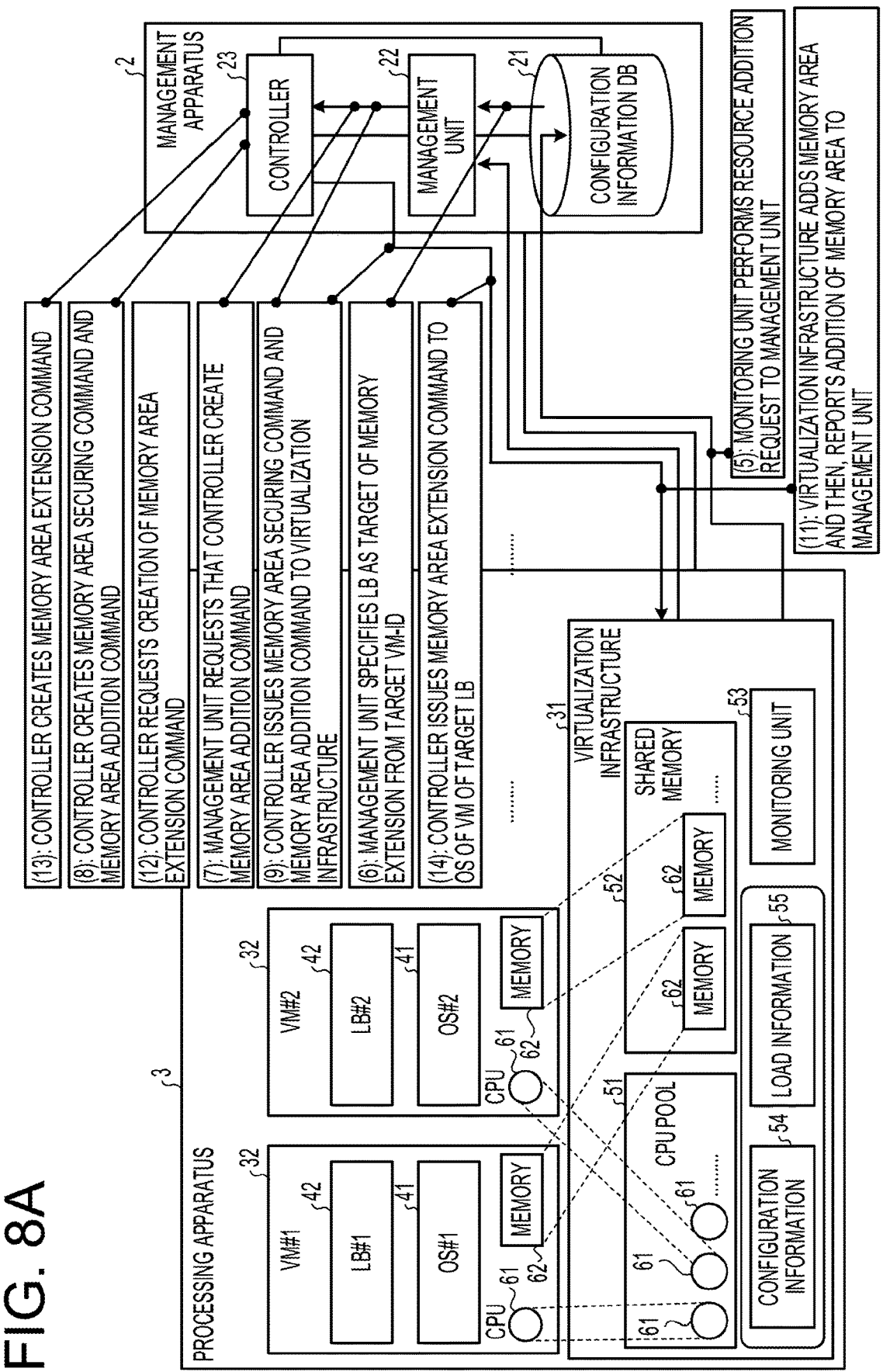
FIG. 8A is a first diagram illustrating an operation relating to memory extension.

As illustrated in FIG. 8A, the monitoring unit 53 executes the resource addition request to the management unit 22 (5). Then, the management unit 22 specifies the LB 42 as a target of the memory extension from the target VM-ID (6) and requests the controller 23 to create the memory area addition command (7). Then, the controller 23 creates the memory area securing command and the memory area addition command (8), and issues the memory area securing command and the memory area addition command to the virtualization infrastructure 31 (9).

Then, as illustrated in FIG. 8B, the virtualization infrastructure 31 executes the memory area securing command and then, executes the memory area addition command to extend the memory 62. The virtualization infrastructure 31 extracts the LB 42 as the target of the memory extension by the command information from the management apparatus 2, the ID of the VM 32, and the process ID of the LB 42 to extend the memory 62 of the VM 32 to be expanded (10).

As illustrated in FIG. 8A, the virtualization infrastructure 31 adds the memory area and then, reports the addition of the memory area to the management unit 22 (11). The management unit 22 requests the controller 23 to create the memory area extension command (12). In addition, the controller 23 creates the memory area extension command (13) and issues the memory area extension command to the OS 41 of the VM 32 of the target LB 42 (14).

As illustrated in FIG. 8B, the OS 41 of the VM 32 of the LB 42 on the virtualization infrastructure combines an area used in the processing of LB #1 with an unused area to extend the corresponding area (15). The area used in the processing of LB #1 includes cookie information, session ID information, and SSL encryption processing information. In addition, the OS 41 of the target VM 32 completes the memory extension and then, reports the completion of the memory extension to the management unit 22 (16).

As described above, the virtualization infrastructure 31 executes the memory area securing command before executing the memory area addition command. Therefore, the OS 41 of the VM 32 of the LB 42 on the virtualization infrastructure may combine the area used in the processing of LB #1 with the unused area while holding the cookie information, the session ID information, and the SSL encryption processing information.

As illustrated in FIG. 9A, the management unit 22 requests the controller 23 to create the CPU addition command (17). Then, the controller 23 creates the LB process protection command based on the target VM-ID and the process ID of the LB 42 (18) and issues the LB process protection command to the OS 41 of the target VM 32 (19).

As illustrated in FIG. 9B, the OS 41 of the target VM 32 executes the LB process protection command (20) and reports the execution completion of the LB process protection command to the controller 23 (21). In addition, as illustrated in FIG. 9A, after receiving the report, the controller 23 specifies the CPU-ID of the unused CPU 61 from the configuration information DB 21 (22) and creates the CPU addition command based on the specified CPU-ID (23). In addition, the controller 23 issues the CPU addition command to the virtualization infrastructure 31 (24).

As illustrated in FIG. 9B, the virtualization infrastructure 31 executes the CPU addition command and adds the CPU 61 of the target VM 32 (25). In addition, the OS 41 of the VM 32 performs usage registration of the added CPU 61 (26). In addition, the virtualization infrastructure 31 completes the addition of the CPU 61 and then, reports the completion of the addition of the CPU 61 to the management unit 22 (27). As illustrated in FIG. 9A, the management unit 22 requests the controller 23 to reflect a state after the processing is completed in the configuration information DB 21 (28). In addition, as illustrated in FIG. 9B, the OS 41 of the VM 32 determines whether a scale-up processing of an LB resource is completed (29).

As illustrated in FIG. 10, when the scale-up processing of the LB resource is completed, the OS 41 of the target LB 42 inputs the processing in the scale-up LB resource (30). In addition, the scale-up LB resource starts the processing (31). In FIG. 10, before the scale-up, there is a situation in which it is impossible to wait for an empty space by the processor or add cookies and sessions. After the scale-up, the situation in which it is impossible to wait for the empty space by the processor or add the cookies and sessions are eliminated.

Figure 11:
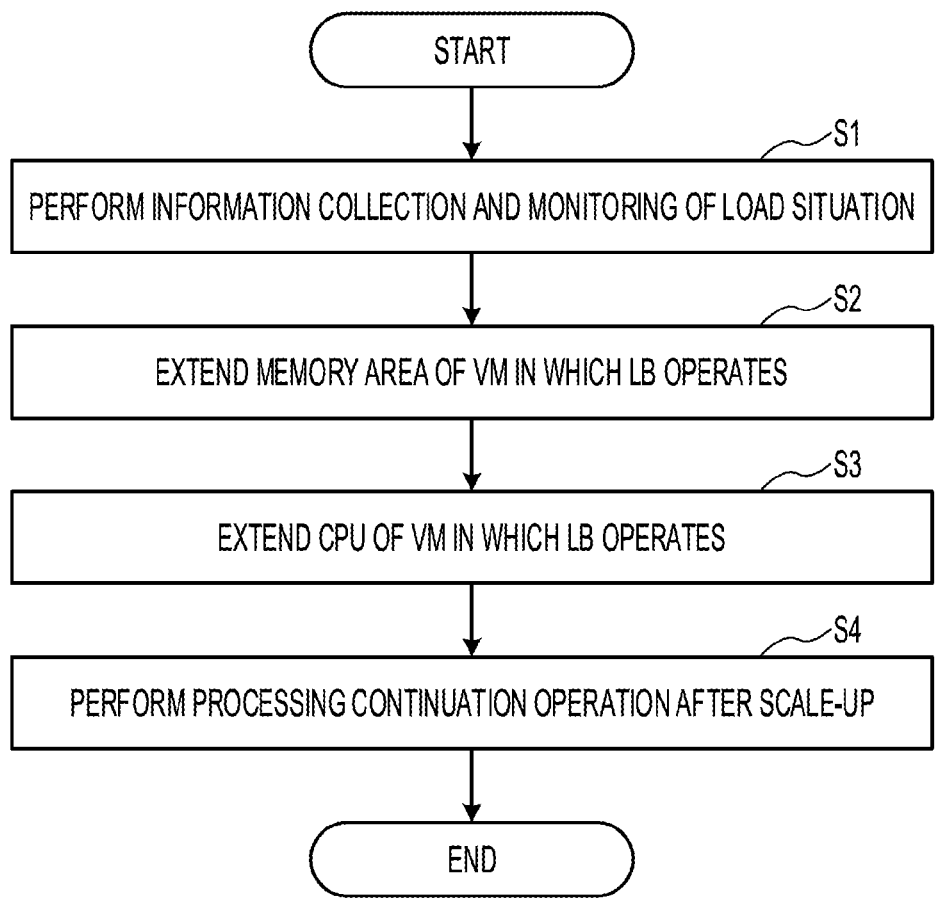
FIG. 11 is a flowchart illustrating an overall flow of a processing when an overload occurs in an LB.

Next, a processing flow when the overload occurs in the LB 42 will be described with reference to FIGS. 11 to 15. FIG. 11 is a flowchart illustrating an overall flow of a processing when the overload occurs in the LB 42. As illustrated in FIG. 11, the information processing system 1 performs information collection and monitoring of a load situation (step S1).

When the overload occurs in the LB 42, the information processing system 1 extends the memory area of the VM 32 in which the LB 42 operates (step S2) and extends the CPU 61 of the VM 32 in which the LB 42 operates (step S3). In addition, the information processing system 1 performs a processing continuation operation after the scale-up (step S4).

As described above, when the overload occurs in the LB 42, the information processing system 1 may instantaneously respond to the overload by automatically extending the memory area of the VM 32 in which the LB 42 operates and the CPU 61.

Figure 12:
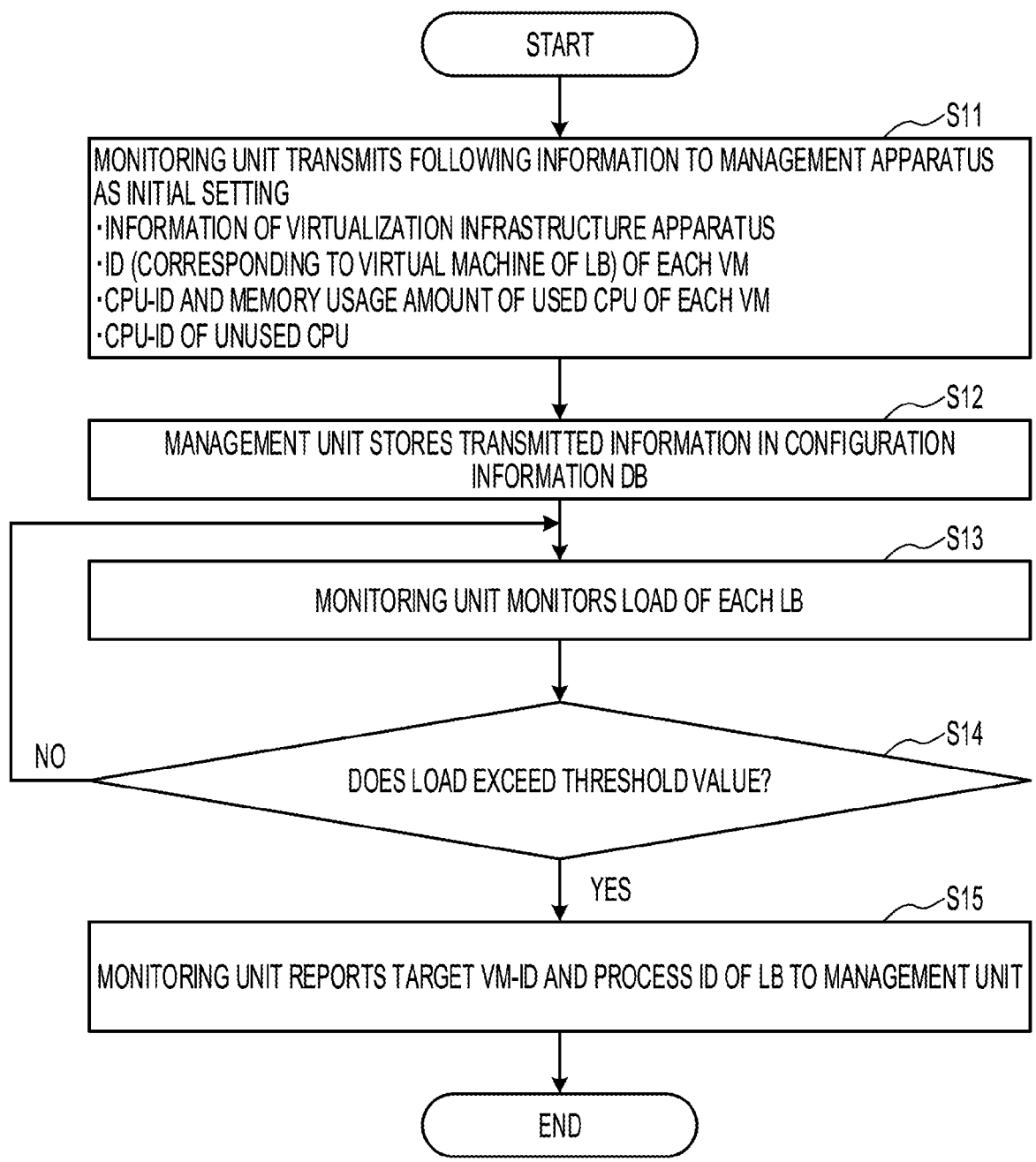
FIG. 12 is a flowchart illustrating a flow of information collection and load situation monitoring processing.

FIG. 12 is a flowchart illustrating a flow of information collection and load situation monitoring processes. Further, the processing of FIG. 12 corresponds to the processing of step S1 illustrated in FIG. 11. As illustrated in FIG. 12, the monitoring unit 53 transmits the information of the virtualization infrastructure apparatus, the ID of each VM 32, the CPU-ID and memory usage amount of the used CPU 61 of each VM 32, and the CPU-ID of the unused CPU 61 to the management apparatus 2 as initial setting (step S11). Here, each VM 32 is a VM 32 that executes the LB 42.

The management unit 22 stores the transmitted information in the configuration information DB 21 (step S12). In addition, the monitoring unit 53 monitors the load of each LB 42 (step S13) to determine whether the load exceeds a threshold value (step S14). In addition, when the load exceeds the threshold value, the monitoring unit 53 reports the target VM-ID and the process ID of the LB 42 to the management unit 22 (step S15).

As described above, the monitoring unit 53 monitors the load of each LB 42 and when the load exceeds the threshold value, the monitoring unit 53 reports the target VM-ID and the process ID of the LB 42 to the management unit 22, and as a result, the management unit 22 may recognize the occurrence of the overload.

Figure 13:
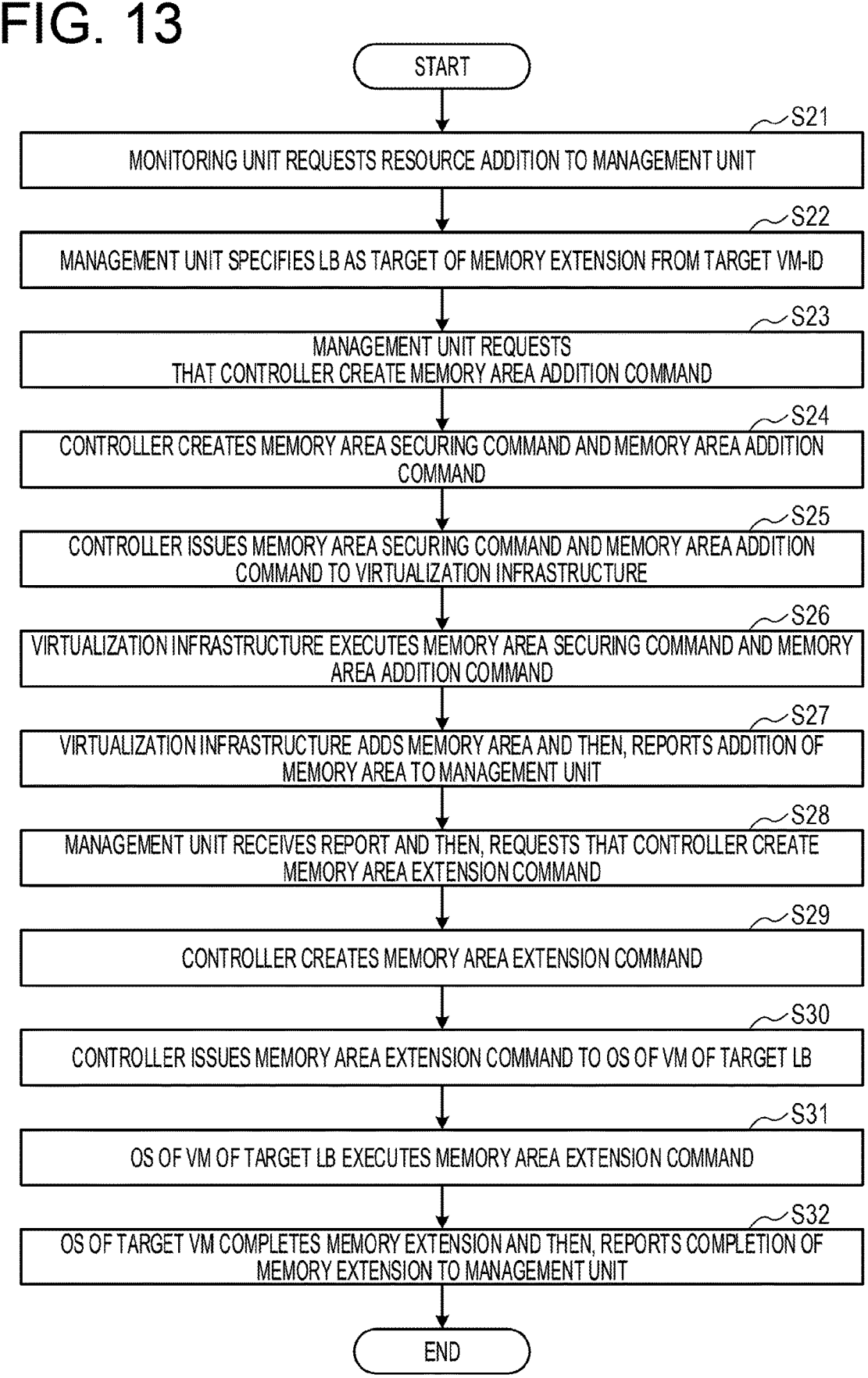
FIG. 13 is a flowchart illustrating a processing flow of extending a memory area.

FIG. 13 is a flowchart illustrating a processing flow of extending a memory area. Further, the processing of FIG. 13 corresponds to the processing of step S2 illustrated in FIG. 11. As illustrated in FIG. 13, the monitoring unit 53 requests the management unit 22 to add a resource (step 21). Then, the management unit 22 specifies the LB 42 as the target of the memory extension from the target VM-ID (step S22) and requests the controller 23 to create the memory area addition command (step S23). Then, the controller 23 creates the memory area securing command and the memory area addition command (step S24) and issues the memory area securing command and the memory area addition command to the virtualization infrastructure 31 (step S25).

Then, the virtualization infrastructure 31 executes the memory area securing command and the memory area addition command (step S26), adds the memory area, and then, reports the addition of the memory area to the management unit 22 (step S27). The management unit 22 requests the controller 23 to create the memory area extension command after receiving the report (step S28). In addition, the controller 23 creates the memory area extension command (step S29) and issues the memory area extension command to the OS 41 of the VM 32 of the target LB 42 (step S30). In addition, the OS 41 of the VM 32 of the target LB 42 executes the memory area extension command (step S31), completes the memory extension, and then, reports the completion of the memory extension to the management unit 22 (step S32).

As described above, the information processing system 1 executes the memory area securing command before executing the memory area addition command to extend the memory area while holding data used by the LB 42 for processing.

Figure 14:
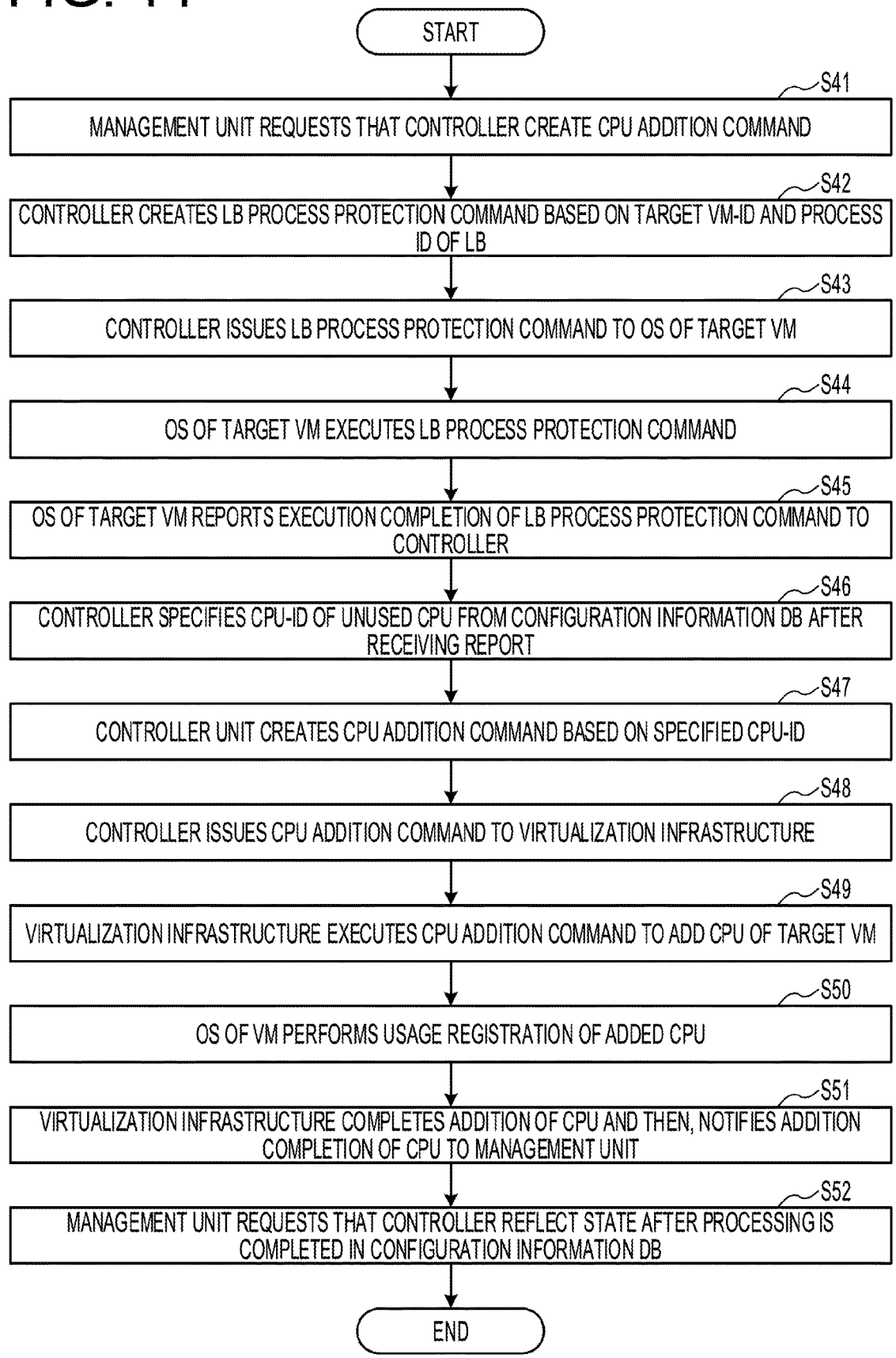
FIG. 14 is a flowchart illustrating a processing flow of extending a CPU.

FIG. 14 is a flowchart illustrating a flow of a processing of extending the CPU 61. Further, the processing of FIG. 14 corresponds to the processing of step S3 illustrated in FIG. 11. As illustrated in FIG. 14, the management unit 22 requests the controller 23 to create the CPU addition command (step S41). Then, the controller 23 creates the LB process protection command based on the target VM-ID and the process ID of the LB 42 (step S42), and issues the LB process protection command to the OS 41 of the target VM 32 (step S43).

The OS 41 of the target VM 32 executes the LB process protection command (step S44) and reports the execution completion of the LB process protection command to the controller 23 (step S45). In addition, after receiving the report, the controller 23 specifies the CPU-ID of the unused CPU 61 from the configuration information DB 21 (step S46), and creates the CPU addition command based on the specified CPU-ID (step S47). In addition, the controller 23 issues the CPU addition command to the virtualization infrastructure 31 (step S48).

The virtualization infrastructure 31 executes the CPU addition command and adds the CPU 61 of the target VM 32 (step S49). In addition, the OS 41 of the VM 32 performs usage registration of the added CPU 61 (step S50). In addition, the virtualization infrastructure 31 completes the addition of the CPU 61 and then, notifies the completion of the addition of the CPU 61 to the management unit 22 (step S51). The management unit 22 requests the controller 23 to reflect the state after the processing is completed in the configuration information DB 21 (step S52).

As described above, since the information processing system 1 executes the LB process protection command before adding the CPU 61, the information processing system 1 fixes allocation of the CPU 61 to the processing of the LB 42 to prevent the LB 42 from being stopped.

Figure 15:
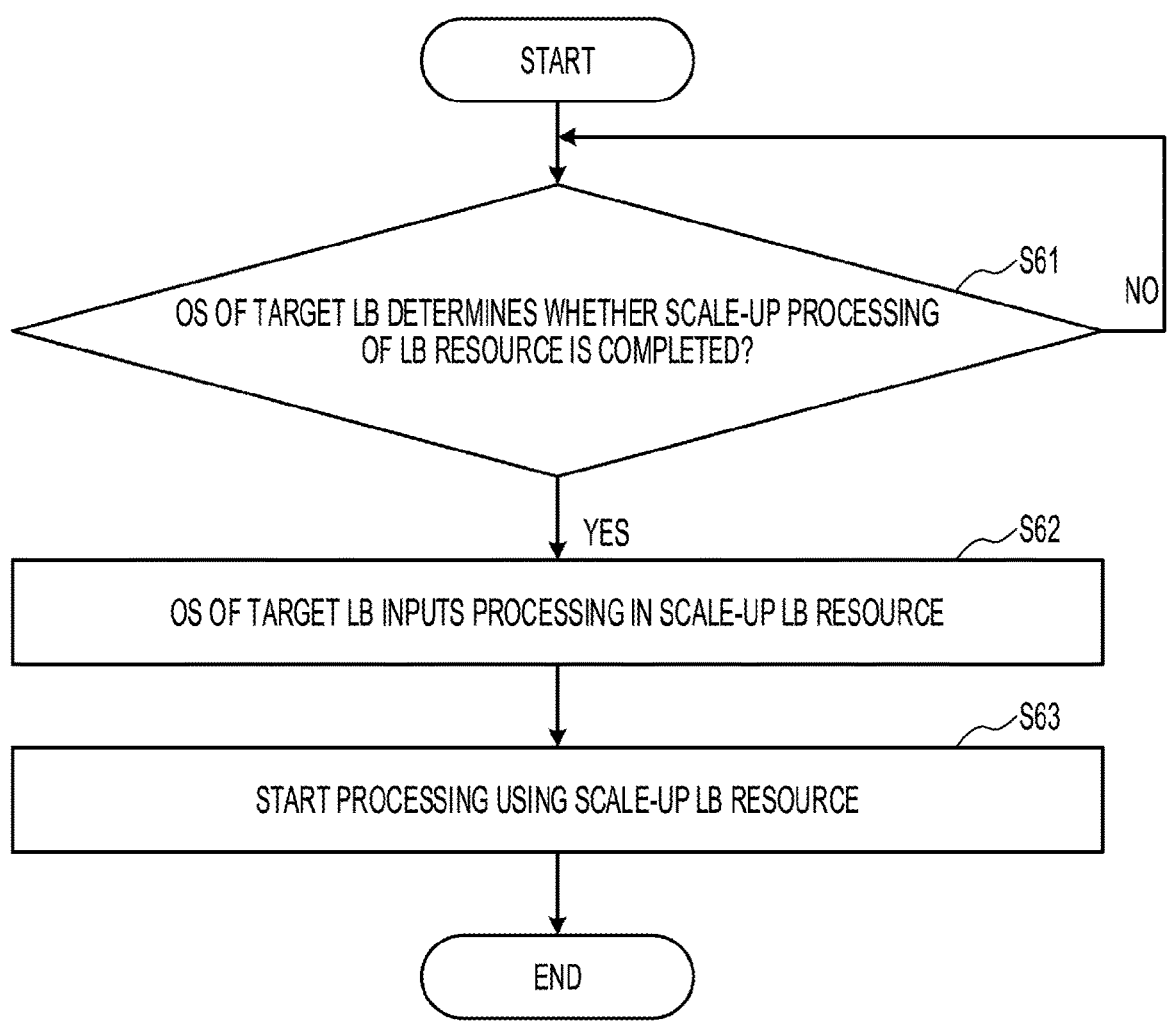
FIG. 15 is a flowchart illustrating a continuation processing flow after scale-up.

FIG. 15 is a flowchart illustrating a continuation processing flow after scale-up. Further, the processing of FIG. 15 corresponds to the processing of step S4 illustrated in FIG. 11. As illustrated in FIG. 15, the OS 41 of the target LB 42 determines whether the scale-up processing of the LB resource is completed (step S61) and when the scale-up processing of the LB resource is completed, the OS 41 of the target LB 42 inputs the processing in the scale-up LB resource (step S62). In addition, the processing using the scale-up LB resource starts (step S63).

As described above, when the information processing system 1 completes the scale-up processing of the LB resource, the information processing system 1 inputs the processing on the scaled-up LB resource, so that the overload of the LB 42 may be eliminated.

Figure 16A:
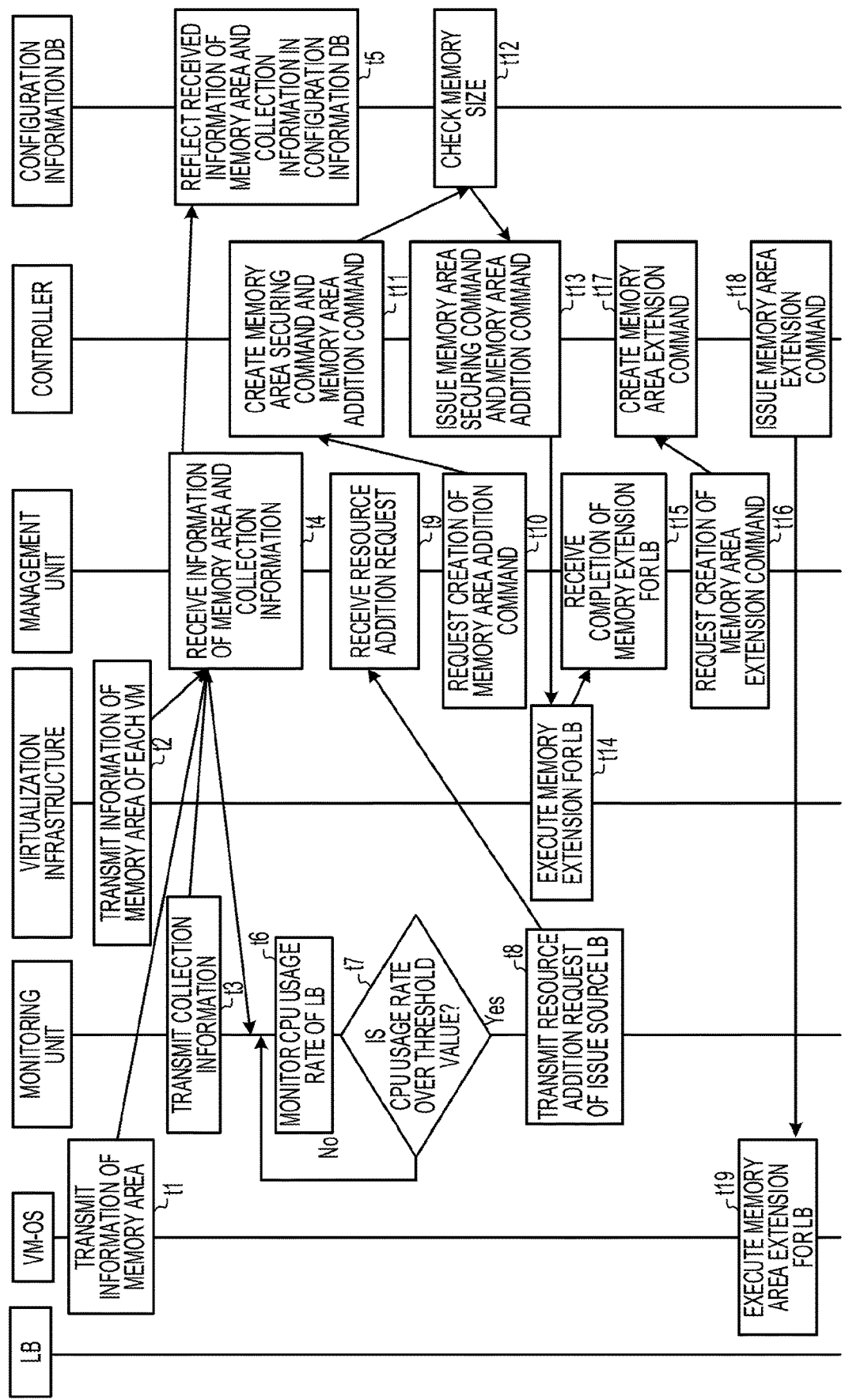
FIG. 16A is a first diagram illustrating a processing order when an overload occurs in an LB.
Figure 16B:
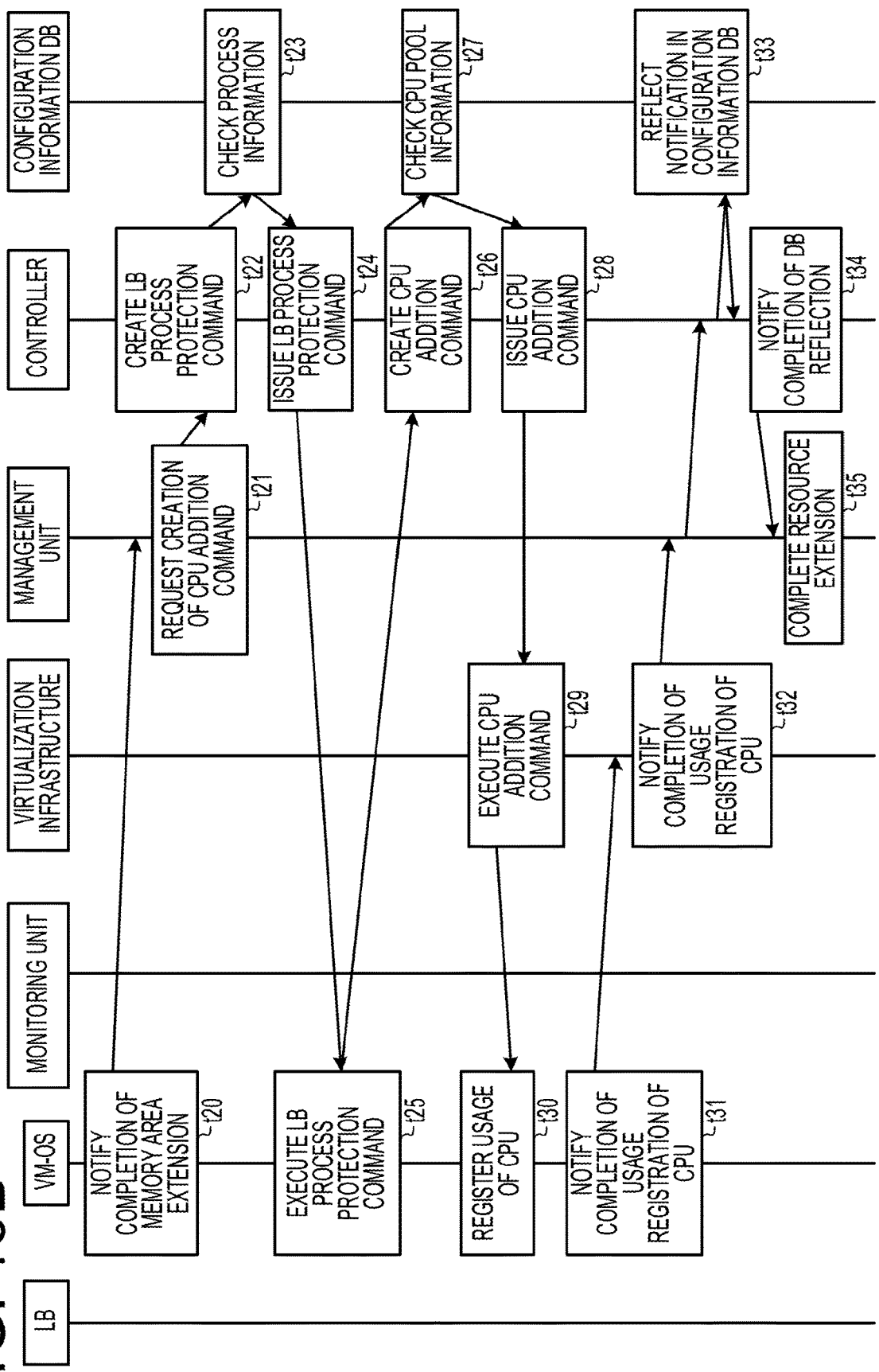
FIG. 16B is a second diagram illustrating a processing order when an overload occurs in an LB.

Next, descriptions will be made on a processing order when the overload occurs in the LB 42. FIGS. 16A and 16B are diagrams illustrating the processing order when the overload occurs in the LB 42. As illustrated in FIG. 16A, the VM-OS 41 transmits the information of the memory area to the management unit 22 (t1). Here, the VM-OS 41 is an OS 41 which operates in the VM 32. In addition, the virtualization infrastructure 31 transmits the information of the memory area of each VM 32 to the management unit 22 (t2).

The monitoring unit 53 transmits collection information to the management unit 22 (t3). Here, the collection information is the information of the virtualization infrastructure apparatus and the ID of each VM 32, the CPU-ID and a memory usage amount of the used CPU 61 of each VM 32, and the CPU-ID of the unused CPU 61 for the VM 32 that executes the LB 42. In addition, the management unit 22 receives the information of the memory area and the collection information (t4), and reflects the received information of the memory area and collection information in the configuration DB 21 (t5).

Then, the monitoring unit 53 monitors the CPU usage rate of the LB 42 (t6) and determines whether the CPU usage rate is over a threshold value (t7). In addition, when the CPU usage rate is over the threshold value, the monitoring unit 53 transmits the resource addition request of a source LB 42 to the management unit 22 (t8).

Then, the management unit 22 receives the resource addition request (t9) to request the controller 23 to create the memory area addition command (t10). Then, the controller 23 creates the memory area securing command and the memory area addition command (t11). In this case, the controller 23 checks a memory size by referring to the configuration information DB 21 (t12). In addition, the controller 23 issues the memory area securing command and the memory area addition command to the virtualization infrastructure 31 (t13).

Then, the virtualization infrastructure 31 executes the memory area addition command after executing the memory area securing command to execute memory extension for the LB (t14) and when the memory extension is completed, the virtualization infrastructure 31 reports the completion of the memory extension for the LB to the management unit 22. The management unit 22 receives the completion of the memory extension for the LB (t15) and requests the controller 23 to create the memory area extension command (t16). In addition, the controller 23 creates the memory area extension command (t17) and issues the memory area extension command to the VM-OS 41 of the target LB 42 (t18).

The VM-OS 41 executes the memory area extension command (t19) and as illustrated in FIG. 16B, the VM-OS 41 notifies the completion of the memory area extension to the management unit 22 (t20). In addition, the management unit 22 requests the controller 23 to create the CPU addition command when receiving the notification of the completion of the memory area extension (t21). Then, the controller 23 creates the LB process protection command (t22). In this case, the controller 23 checks process information by referring to the configuration information DB 21 (t23). Then, the controller 23 issues the LB process protection command to the VM-OS 41 (t24).

The VM-OS 41 executes the LB process protection command (t25) and reports the execution completion of the LB process protection command to the controller 23. In addition, when the report is received, the controller 23 creates the CPU addition command (t26). In this case, the controller 23 checks CPU pool information by referring to the configuration information DB 21 (t27). In addition, the controller 23 issues the CPU addition command to the virtualization infrastructure 31 (t28).

The virtualization infrastructure 31 executes the CPU addition command (t29) and adds the CPU 61 to the target VM 32. In addition, the VM-OS 41 performs the usage registration of the added CPU 61 (t30) and notifies the completion of the usage registration of the CPU 61 to the virtualization infrastructure 31 (t31). The virtualization infrastructure 31 notifies the completion of the usage registration of the CPU 61 to the management unit 22 (t32).

The management unit 22 requests the controller 23 to reflect the state after the processing is completed in the configuration information DB 21 and the controller 23 reflects the state after the processing is completed in the configuration information DB 21 (t33). In addition, the controller 23 notifies the completion of the DB reflection to the management unit 22 (t34) and the management unit 22 completes the resource extension (t35).

As described above, when the overload occurs in the LB 42, the information processing system 1 adds the CPU 61 by extending the memory area, thereby eliminating the overload of the LB 42.

As described above, in the first embodiment, the information processing system 1 includes the management apparatus 2 and the processing apparatus 3, and in the processing apparatus 3, the VM 32 that executes the LB 42 operates under the control of the virtualization infrastructure 31 in the processing apparatus 3 and the management apparatus 2 manages the configuration information DB 21. In addition, the monitoring unit 53 of the virtualization infrastructure 31 monitors the load of the LB 42 and when the load exceeds the threshold value, the monitoring unit 53 notifies the occurrence of the overload to the management apparatus 2. In addition, the controller 23 of the management apparatus 2 creates the memory area addition command and the CPU addition command, and issues the created commands to the virtualization infrastructure 31 by referring to the configuration information DB 21. In addition, the virtualization infrastructure 31 executes the memory area addition command and the CPU addition command. Therefore, the information processing system 1 may instantaneously increase the CPU 61 and the memory 62 allocated to the LB 42.

In the first embodiment, since the virtualization infrastructure 31 executes the memory area securing command before executing the memory area addition command, the virtualization infrastructure 31 may extend the memory 62 while holding the data area used by the LB 42.

In the first embodiment, the controller 23 issues the LB process protection command before issuing the CPU addition command and the OS 41 executes the LB process protection command before the CPU 61 is added to fix the CPU 61 to the LB process, thereby preventing the LB process from being stopped.

In the first embodiment, descriptions have been made on a case where the CPU 61 and the memory 62 are added, but the information processing system 1 may add one of the CPU 61 and the memory 62.

Second Embodiment

However, in the first embodiment, the LB 42 manages one site, but the LB 42 may manage a plurality of sites. Here, in the second embodiment, descriptions have been made on a case where the LB 42 manages two sites. Further, the LB 42 may manage three or more sites.

FIG. 17 is a diagram illustrating operations of a processing apparatus 3 and a management apparatus 2 when a load of one site rises. In FIG. 17, LB #1 performs load distribution to two sites, that is, site #1 and site #2. Site #1 is associated with a user identified by "UserA" and site #2 is associated with a user identified by "UserB". A process ID (PID) of the LB process that performs the load distribution to site #1 is "01" and a process ID of the LB process that performs the load distribution to site #2 is "02".

As illustrated in FIG. 17, when an access amount of site #1 increases (1), the monitoring unit 53 detects that the CPU load of VM #1 is over the threshold value (2) and transmits an overload notification to the management unit 22 together with the VM-ID and the process ID of the LB process corresponding to site #1 (3). When receiving the CPU overload notification, the management unit 22 selects the unused CPU 61 from the configuration information DB 21 and specifies the CPU-ID corresponding to the process ID (4).

The controller 23 creates the memory area securing command, the memory area addition command, the memory area extension command, a linkage command, and the CPU addition command (5). Here, the linkage command is a command of linking the CPU-ID of the CPU 61 of the overload, the process, and the site (user). Further, in order to specify the site (user), information on the site (user) is added to the LB management table illustrated in FIG. 3. In addition, the controller 23 notifies the memory area securing command, the memory area addition command, and the CPU addition command to the target virtualization infrastructure 31 and notifies the memory area extension command and the linkage command to OS #1 (6).

The virtualization infrastructure 31 executes the memory area securing command (7) and executes the memory area addition command (8). In addition, OS #1 executes the memory area extension command (9) and executes the linkage command (10). OS #1 which executes the linkage command may fix allocation of the CPU 61 to the LB process that performs the load distribution to site #1. In addition, the virtualization infrastructure 31 executes the CPU addition command (11).

As described above, OS #1 executes the linkage command of linking the CPU-ID, the process, the site, and the user, and the information processing system 1 may extend the resource allocated to LB #1 while maintaining the processing of site #1 by LB #1.

As described above, in the second embodiment, the monitoring unit 53 monitors the load of the LB 42 for each site and there is a site in which the load exceeds the threshold value, the monitoring unit 53 notifies the occurrence of the overload to the management apparatus 2. In addition, the controller 23 creates the linkage command, and as a result, the OS 41 executes the linkage command before executing the CPU addition command. Therefore, the information processing system 1 may fix the allocation of the CPU 61 to the process that performs the load distribution for each site to extend the CPU 61 while maintaining the processing of the LB 42 for each site.

In the first and second embodiments, the management apparatus 2 has been described, but a component of the management apparatus 2 is implemented by software, thereby acquiring a control program having the same function. Therefore, a computer executing the control program will be described.

Figure 18:
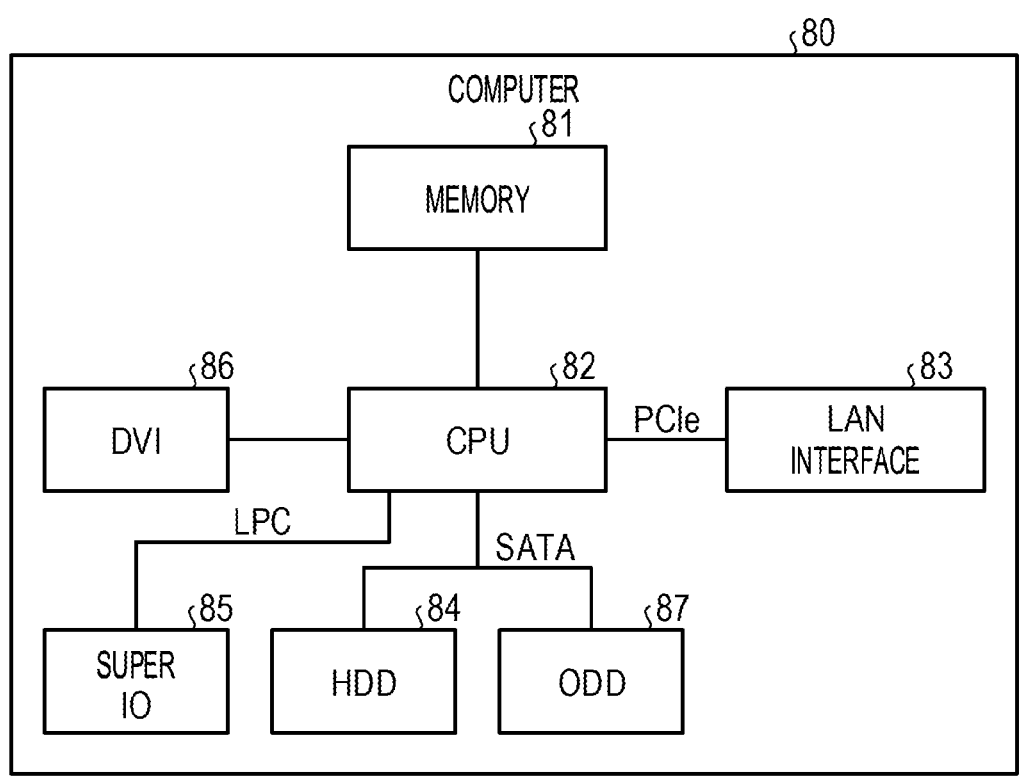
FIG. 18 is a diagram illustrating a hardware configuration of a computer that executes a control program according to the first and second embodiments.

FIG. 18 is a diagram illustrating a hardware configuration of a computer that executes a control program according to the first and second embodiments. As illustrated in FIG. 18, a computer 80 includes a memory 81, a CPU 82, a local area network (LAN) interface 83, and a hard disk drive (HDD) 84. Further, the computer 80 includes a super input output (IO) 85, a digital visual interface (DVI) 86, and an optical disk drive (ODD) 87.

The memory 81 is a random access memory (RAM) that stores a program or a result during execution of the program. The CPU 82 is a central processing unit that reads and executes the program from the memory 81. The CPU 82 includes a chip set having a memory controller.

The LAN interface 83 is an interface that connects the computer 80 to another computer via a LAN. The HDD 84 is a disk device that stores the program or data and the super IO 85 is an interface that connects an input device such as a mouse or keyboard. The DVI 86 is an interface that accesses a liquid crystal display device and the ODD 87 is a device that reads and writes a DVD.

The LAN interface 83 is connected to the CPU 82 by the PCI express (PCIe), and the HDD 84 and the ODD 87 are connected to the CPU 82 by Serial Advanced Technology Attachment (SATA). The super IO 85 is connected to the CPU 82 by low pin count (LPC).

The control program executed by the computer 80 is stored in the DVD as an example of a storage medium readable by the computer 80, read from the DVD by the ODD 87, and installed in the computer 80. Alternatively, the control program may be stored in the database of another computer system connected via the LAN interface 83, and read from the database and installed in the computer 80. In addition, the installed control program is stored in the HDD 84, read by the memory 81, and executed by the CPU 82.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing system comprising:
  allocation to a first virtual machine that operates on the information an information processing apparatus including a first processor; and
  a management apparatus including a memory and a second processor coupled to the memory,
  the first processor is configured to:
    control resource processing apparatus and executes a virtual load balancer that distributes a first load to a plurality of second virtual machines, the virtual load balancer performs a load distribution on processes for each of a plurality of sites;
    monitor a second load of the virtual load balancer executed by the first virtual machine;
    notify, when the second load exceeds a predetermined first threshold value, an occurrence of an overload to the management apparatus;
    receive, from the management apparatus, an addition command of adding a resource allocated to the first virtual machine;
    execute the addition command to add the resource;
    monitor a third load for each of the plurality of sites;
    notify, when the third load exceeds a predetermined second threshold value, an occurrence of an overload to the management apparatus; and
    execute the addition command of adding a third processor after a linkage command is executed by a computer, and
  the second processor is configured to:
    create, upon being notified of the occurrence of the overload, the addition command based on resource information of the information processing apparatus and management information of the virtual load balancer, the resource information and the management information being stored in the memory;
    notify the addition command to the information processing apparatus;
    create, when creating the addition command of adding the third processor as the resource, the linkage command of fixing the third processor that executes a first process of performing the load distribution in a site of the plurality of sites in which the overload occurs; and notify the linkage command to the computer that controls the first virtual machine.

2. The information processing system according to claim 1, wherein the resource is at least a fourth processor or a second memory.

3. The information processing system according to claim 1, wherein the second processor is further configured to:

create, when creating the addition command of adding a third memory as the resource, a securing command of securing a data area used by the virtual load balancer for processing;

notify the securing command and the addition command of adding the third memory to the information processing apparatus, and the first processor is further configured to:

execute the addition command of adding the third memory after executing the securing command.

4. The information processing system according to claim 1, wherein the second processor is further configured to:

create, when creating the addition command of adding a fourth processor as the resource, a protection command of fixing the fourth processor that executes the virtual load balancer; and notify the protection command to the computer that controls the first virtual machine, and the first processor is further configured to:

execute the addition command of adding the fourth processor after the protection command is executed by the computer.

5. A method of controlling an information processing system, the method comprising:

controlling, by a first computer included in the information processing system, resource allocation to a first virtual machine that operates on the first computer and executes a virtual load balancer that distributes a first load to a plurality of second virtual machines, the virtual load balancer performs a load distribution on processes for each of a plurality of sites;

monitoring, by the first computer, a second load of the virtual load balancer executed by the first virtual machine;

notifying by the first computer, when the second load exceeds a predetermined first threshold value, an occurrence of an overload to a second computer included in the information processing system;

creating by the second computer, upon being notified of the occurrence of the overload, an addition command of adding a resource allocated to the first virtual machine based on resource information of the first computer and management information of the virtual load balancer, the resource information and the management information being stored in a memory of the second computer;

notifying, by the second computer, the addition command to the first computer;

receiving, by the first computer, the addition command from the second computer;

executing, by the first computer, the addition command to add the resource;

monitoring, by the first computer, a third load for each of the plurality of sites;

notifying, by the first computer, when the third load exceeds a predetermined second threshold value, an occurrence of an overload to the management apparatus;

executing, by the first computer, the addition command of adding a third processor after a linkage command is executed by a third computer;

creating, by the second computer, when creating the addition command of adding the third processor as the resource, the linkage command of fixing the third processor that executes a first process of performing the load distribution in a site of the plurality of sites in which the overload occurs; and notifying, by the second computer, the linkage command to the third computer that controls the first virtual machine.

6. A non-transitory computer-readable recording medium having stored therein a program for controlling an information processing system, the process comprising:

controlling, by a first computer included in the information processing system, resource allocation to a first virtual machine that operates on the first computer and executes a virtual load balancer that distributes a first load to a plurality of second virtual machines, the virtual load balancer performs a load distribution on processes for each of a plurality of sites;

monitoring, by the first computer, a second load of the virtual load balancer executed by the first virtual machine;

notifying by the first computer, when the second load exceeds a predetermined first threshold value, an occurrence of an overload to a second computer included in the information processing system;

creating by the second computer, upon being notified of the occurrence of the overload, an addition command of adding a resource allocated to the first virtual machine based on resource information of the first computer and management information of the virtual load balancer, the resource information and the management information being stored in a memory of the second computer;

notifying, by the second computer, the addition command to the first computer;

receiving, by the first computer, the addition command from the second computer;

executing, by the first computer, the addition command to add the resource;

monitoring, by the first computer, a third load for each of the plurality of sites;

notifying, by the first computer, when the third load exceeds a predetermined second threshold value, an occurrence of an overload to the management apparatus;

executing, by the first computer, the addition command of adding a third processor after a linkage command is executed by a third computer;

creating, by the second computer, when creating the addition command of adding the third processor as the resource, the linkage performing the load distribution in a site of the plurality of sites in which the overload occurs; and notifying, by the second computer, the linkage command to the third computer that controls the first virtual machine.

* * * * *